(12) United States Patent
Giordano et al.

(10) Patent No.: US 7,571,139 B1
(45) Date of Patent: Aug. 4, 2009

(54) SYSTEM AND METHOD FOR PROCESSING FINANCIAL TRANSACTIONS

(76) Inventors: Joseph A. Giordano, 15344 Oakmere Pl., Centreville, VA (US) 20120; Tory N. Travis, 8724 N. Campbell St., Kansas City, MO (US) 64155; Louis C. Garbarino, 11709 Sumacs St., Oakton, VA (US) 22124

( * ) Notice: Subject to any disclaimer, the term of this patent is extended or adjusted under 35 U.S.C. 154(b) by 0 days.

(21) Appl. No.: 09/505,721

(22) Filed: Feb. 17, 2000

Related U.S. Application Data

(60) Provisional application No. 60/120,760, filed on Feb. 19, 1999.

(51) Int. Cl.
*G06Q 40/00* (2006.01)
(52) U.S. Cl. .............................. 705/40; 705/39; 705/38; 705/37
(58) Field of Classification Search ............. 705/35–40; 455/406; 141/94, 2, 98, 321
See application file for complete search history.

(56) References Cited

U.S. PATENT DOCUMENTS

| | | | |
|---|---|---|---|
| 3,184,714 A | 5/1965 | Brown, Jr. et al. | |
| 3,527,268 A | 9/1970 | Ginsburg | |
| 3,536,109 A | 10/1970 | Ginsburgh et al. | |
| 3,602,881 A | 8/1971 | Bayne et al. | |
| 3,639,894 A | 2/1972 | Tanaka | |
| 3,641,569 A | 2/1972 | Bushnell et al. | |
| 3,642,036 A | 2/1972 | Ginsburgh et al. | |
| 3,650,303 A | 3/1972 | Chambers et al. | |
| 3,670,303 A | 6/1972 | Dame | |
| 3,742,150 A | 6/1973 | Sherman et al. | |
| 3,765,567 A | 10/1973 | Maiocco et al. | |
| 3,786,421 A | 1/1974 | Wostl et al. | |
| 3,814,148 A | 6/1974 | Wostl | |
| 3,873,019 A | 3/1975 | Holcomb | |
| 3,931,497 A | 1/1976 | Gentile et al. | |
| 3,952,285 A | 4/1976 | Flack, Jr. | |

(Continued)

FOREIGN PATENT DOCUMENTS

BR PI9803356-5 5/2000

(Continued)

OTHER PUBLICATIONS

Symbol Technologies announces plug-and-play networking system for small businesses Picker, Doug. Business Wire. New York: Jan. 16, 1995. Sec. 1. p. 1.*

(Continued)

*Primary Examiner*—Frantzy Poinvil
*Assistant Examiner*—Clement Graham
(74) *Attorney, Agent, or Firm*—Hunton & Williams, LLP

(57) ABSTRACT

A network for processing retail sales transactions includes a customer transceiver with a unique customer number, a reader receiving the customer number and sending it to a point-of-sale device where it is combined with transaction information to form a transaction entry. The transaction entry is sent through a merchant computer to a transaction processing system having a customer database. The transaction processing system references an entry in the customer database corresponding to the customer/transmitter ID number and routes the transaction entry to a payment processing system specified in the customer database entry.

44 Claims, 19 Drawing Sheets

U.S. PATENT DOCUMENTS

| | | | |
|---|---|---|---|
| 4,067,061 A | 1/1978 | Juhasz | |
| 4,075,632 A | 2/1978 | Baldwin et al. | |
| 4,109,686 A | 8/1978 | Phillips | |
| 4,199,100 A | 4/1980 | Wostl et al. | |
| 4,250,550 A | 2/1981 | Fleischer | |
| 4,258,421 A | 3/1981 | Juhasz et al. | |
| 4,263,945 A | 4/1981 | Van Ness | |
| 4,278,977 A | 7/1981 | Nossen | |
| 4,303,904 A | 12/1981 | Chasek | |
| 4,313,168 A | 1/1982 | Stephens et al. | |
| 4,325,146 A | 4/1982 | Lennington | |
| 4,333,072 A | 6/1982 | Beigel | |
| 4,335,426 A | 6/1982 | Maxwell et al. | |
| 4,338,587 A | 7/1982 | Chiappetti | |
| 4,344,136 A | 8/1982 | Panik | |
| 4,345,146 A | 8/1982 | Story et al. | |
| 4,361,837 A | 11/1982 | Malinowski et al. | |
| 4,384,288 A | 5/1983 | Walton | |
| 4,395,626 A | 7/1983 | Barker et al. | |
| 4,395,627 A | 7/1983 | Barker et al. | |
| 4,398,172 A | 8/1983 | Carroll et al. | |
| 4,399,437 A | 8/1983 | Falck et al. | |
| 4,404,639 A | 9/1983 | McGuire et al. | |
| 4,454,414 A | 6/1984 | Benton | |
| 4,469,149 A | 9/1984 | Walkey et al. | |
| 4,482,964 A | 11/1984 | Berstein et al. | |
| 4,488,153 A | 12/1984 | Lange | |
| 4,490,798 A | 12/1984 | Franks et al. | |
| 4,511,970 A | 4/1985 | Okano et al. | |
| 4,532,511 A | 7/1985 | Lemelson | |
| 4,546,241 A | 10/1985 | Walton | |
| 4,555,618 A | 11/1985 | Riskin | |
| 4,563,739 A | 1/1986 | Gerpheide et al. | |
| 4,600,829 A | 7/1986 | Walton | |
| 4,614,945 A | 9/1986 | Brunius et al. | |
| 4,627,553 A | 12/1986 | Yoshida et al. | |
| 4,630,292 A | 12/1986 | Juricich et al. | |
| 4,631,708 A | 12/1986 | Wood et al. | |
| 4,658,371 A | 4/1987 | Walsh et al. | |
| 4,665,399 A | 5/1987 | Fauser et al. | |
| 4,688,026 A | 8/1987 | Scribner et al. | |
| 4,691,202 A | 9/1987 | Denne et al. | |
| 4,700,055 A | 10/1987 | Kashkashian, Jr. | |
| 4,714,925 A | 12/1987 | Barlett | |
| 4,722,054 A | 1/1988 | Yorozu et al. | |
| 4,728,955 A | 3/1988 | Hane | |
| 4,730,188 A | 3/1988 | Milheiser | |
| 4,739,328 A | 4/1988 | Koelle et al. | |
| 4,747,049 A | 5/1988 | Richardson et al. | |
| 4,752,899 A | 6/1988 | Newman et al. | |
| 4,799,059 A | 1/1989 | Grindahl et al. | |
| 4,804,937 A | 2/1989 | Barbiaux et al. | |
| 4,804,961 A | 2/1989 | Hane | |
| 4,829,540 A | 5/1989 | Waggener, Sr. et al. | |
| 4,837,556 A | 6/1989 | Matsushita et al. | |
| 4,839,854 A | 6/1989 | Sakami et al. | |
| 4,846,233 A | 7/1989 | Fockens | |
| 4,853,859 A | 8/1989 | Morita et al. | |
| 4,862,160 A | 8/1989 | Ekchian et al. | |
| 4,862,162 A | 8/1989 | Daley | |
| 4,864,615 A | 9/1989 | Bennett et al. | |
| 4,870,419 A | 9/1989 | Baldwin et al. | |
| 4,881,581 A | 11/1989 | Hollerback | |
| 4,882,779 A | 11/1989 | Rahtgen | |
| 4,897,642 A | 1/1990 | DiLullo et al. | |
| 4,906,826 A | 3/1990 | Spencer | |
| 4,912,471 A | 3/1990 | Tyburski et al. | |
| 4,916,296 A | 4/1990 | Streck | |
| 4,918,955 A | 4/1990 | Kimura et al. | |
| 4,926,331 A | 5/1990 | Windle et al. | |
| 4,929,818 A | 5/1990 | Bradbury et al. | |
| 4,932,049 A | 6/1990 | Lee | |
| 4,934,419 A | 6/1990 | Lamont et al. | |
| 4,937,581 A | 6/1990 | Baldwin et al. | |
| 4,967,366 A | 10/1990 | Kaehler | |
| 4,977,501 A | 12/1990 | Lefevre | |
| 4,984,291 A | 1/1991 | Dias et al. | |
| 4,989,146 A | 1/1991 | Imajo | |
| 5,025,139 A | 6/1991 | Halliburton, Jr. | |
| 5,025,253 A | 6/1991 | DiLullo et al. | |
| 5,025,486 A | 6/1991 | Klughart | |
| 5,030,807 A | 7/1991 | Landt et al. | |
| 5,041,826 A | 8/1991 | Milheiser | |
| 5,047,613 A | 9/1991 | Swegen et al. | |
| 5,053,774 A | 10/1991 | Schuermann et al. | |
| 5,055,659 A | 10/1991 | Hendrick et al. | |
| 5,058,044 A | 10/1991 | Stewart et al. | |
| 5,059,951 A | 10/1991 | Kaltner | |
| 5,070,328 A | 12/1991 | Fockens | |
| 5,070,535 A | 12/1991 | Hochmair et al. | |
| 5,072,222 A | 12/1991 | Fockens | |
| 5,072,380 A | 12/1991 | Randelman et al. | |
| 5,073,781 A | 12/1991 | Stickelbrocks | |
| 5,086,389 A | 2/1992 | Hassett et al. | |
| 5,088,621 A | 2/1992 | Thompson et al. | |
| 5,113,183 A | 5/1992 | Mizuno et al. | |
| 5,124,697 A | 6/1992 | Moore | |
| 5,132,687 A | 7/1992 | Baldwin et al. | |
| 5,144,312 A | 9/1992 | McCann | |
| 5,144,553 A | 9/1992 | Hassett et al. | |
| 5,144,667 A | 9/1992 | Pogue, Jr. et al. | |
| 5,146,068 A | 9/1992 | Ugawa et al. | |
| 5,156,198 A | 10/1992 | Hall | |
| 5,164,985 A | 11/1992 | Nysen et al. | |
| 5,166,676 A | 11/1992 | Milheiser | |
| 5,175,416 A | 12/1992 | Mansvelt et al. | |
| 5,184,309 A | 2/1993 | Simpson et al. | |
| 5,192,954 A | 3/1993 | Brockelsby et al. | |
| 5,196,846 A | 3/1993 | Brockelsby et al. | |
| 5,200,601 A | 4/1993 | Jarvis | |
| 5,202,826 A | 4/1993 | McCarthy | |
| 5,204,512 A | 4/1993 | Ieki et al. | |
| 5,204,819 A | 4/1993 | Ryan | |
| 5,206,488 A | 4/1993 | Teicher | |
| 5,211,129 A | 5/1993 | Taylor et al. | |
| 5,214,409 A | 5/1993 | Beigel | |
| 5,220,501 A | 6/1993 | Lawlor et al. | |
| 5,228,084 A | 7/1993 | Johnson et al. | |
| 5,241,160 A | 8/1993 | Bashan et al. | |
| 5,253,162 A | 10/1993 | Hassett | |
| 5,257,011 A | 10/1993 | Beigel | |
| 5,270,717 A | 12/1993 | Schuermann | |
| 5,287,112 A | 2/1994 | Schuermann | |
| 5,294,782 A | 3/1994 | Kumar | |
| 5,294,931 A | 3/1994 | Meier | |
| 5,310,999 A | 5/1994 | Claus et al. | |
| 5,311,186 A | 5/1994 | Utsu et al. | |
| 5,321,753 A | 6/1994 | Gritton | |
| 5,325,082 A | 6/1994 | Rodriguez | |
| 5,327,066 A | 7/1994 | Smith | |
| 5,340,969 A | 8/1994 | Cox | |
| 5,343,906 A | 9/1994 | Tibbals, III | |
| 5,347,280 A | 9/1994 | Schuermann | |
| 5,349,332 A | 9/1994 | Ferguson et al. | |
| 5,351,052 A | 9/1994 | D'Hont et al. | |
| 5,351,187 A | 9/1994 | Hassett | |
| 5,352,877 A | 10/1994 | Morley | |
| 5,355,120 A | 10/1994 | Ferguson et al. | |
| 5,355,137 A | 10/1994 | Schurmann | |
| 5,359,522 A | 10/1994 | Ryan | |
| 5,361,871 A | 11/1994 | Gupta et al. | |
| 5,369,706 A | 11/1994 | Latka | |
| 5,374,930 A | 12/1994 | Schuermann | |
| 5,376,778 A | 12/1994 | Kreft | |

| | | | | | |
|---|---|---|---|---|---|
| 5,377,097 A | 12/1994 | Fuyama et al. | 5,592,150 A | 1/1997 | D'Hont |
| 5,377,270 A | 12/1994 | Koopman, Jr. et al. | 5,594,448 A | 1/1997 | d'Hont |
| 5,383,500 A | 1/1995 | Dwars et al. | 5,596,501 A | 1/1997 | Comer et al. |
| 5,384,850 A | 1/1995 | Johnson et al. | 5,598,475 A | 1/1997 | Soenen et al. |
| 5,388,165 A | 2/1995 | Deaton et al. | 5,602,375 A | 2/1997 | Sunahara et al. |
| 5,392,049 A | 2/1995 | Gunnarsson | 5,602,538 A | 2/1997 | Orthmann et al. |
| 5,396,251 A | 3/1995 | Schuermann | 5,602,745 A | 2/1997 | Atchley et al. |
| 5,410,315 A | 4/1995 | Huber | 5,602,919 A | 2/1997 | Hurta et al. |
| 5,414,427 A | 5/1995 | Gunnarsson | 5,605,182 A | 2/1997 | Oberrecht et al. |
| 5,418,751 A | 5/1995 | Kaiser | 5,608,406 A | 3/1997 | Eberth et al. |
| 5,422,624 A | 6/1995 | Smith | 5,612,890 A | 3/1997 | Strasser et al. |
| 5,428,363 A | 6/1995 | D'Hont | 5,619,207 A | 4/1997 | d'Hont |
| 5,430,447 A | 7/1995 | Meier | 5,621,396 A | 4/1997 | Flaxl |
| 5,432,518 A | 7/1995 | van Erven | 5,621,411 A | 4/1997 | Hagl et al. |
| 5,434,572 A | 7/1995 | Smith | 5,621,412 A | 4/1997 | Sharpe et al. |
| 5,438,335 A | 8/1995 | Schuermann | 5,625,370 A | 4/1997 | D'Hont |
| 5,444,448 A | 8/1995 | Schuermann et al. | 5,628,351 A | 5/1997 | Ramsey, Jr. et al. |
| 5,444,742 A | 8/1995 | Grabow et al. | 5,629,981 A | 5/1997 | Nerlikar |
| 5,448,242 A | 9/1995 | Sharpe et al. | 5,637,845 A | 6/1997 | Kolls |
| 5,448,638 A | 9/1995 | Johnson et al. | 5,637,846 A | 6/1997 | Boers et al. |
| 5,450,086 A | 9/1995 | Kaiser | 5,638,875 A | 6/1997 | Corfitsen |
| 5,450,087 A | 9/1995 | Hurta et al. | 5,640,002 A | 6/1997 | Ruppert et al. |
| 5,450,088 A | 9/1995 | Meier et al. | 5,644,119 A | 7/1997 | Padula et al. |
| 5,450,492 A | 9/1995 | Hook et al. | 5,644,723 A | 7/1997 | Deaton et al. |
| 5,451,758 A | 9/1995 | Jesadanont | 5,648,767 A | 7/1997 | O'Connor et al. |
| 5,451,958 A | 9/1995 | Schuermann | 5,649,115 A | 7/1997 | Schrader et al. |
| 5,451,959 A | 9/1995 | Schuermann | 5,657,388 A | 8/1997 | Weiss |
| 5,453,747 A | 9/1995 | D'Hont et al. | 5,663,548 A | 9/1997 | Hayashi et al. |
| 5,455,575 A | 10/1995 | Schuermann | 5,668,876 A | 9/1997 | Falk et al. |
| 5,457,461 A | 10/1995 | Schuermann | 5,675,342 A | 10/1997 | Sharpe |
| 5,461,386 A | 10/1995 | Knebelkamp | 5,686,920 A | 11/1997 | Hurta et al. |
| 5,471,212 A | 11/1995 | Sharpe et al. | 5,687,322 A | 11/1997 | Deaton et al. |
| 5,471,668 A | 11/1995 | Soenen et al. | 5,689,433 A | 11/1997 | Edwards |
| 5,471,669 A | 11/1995 | Lidman | 5,691,731 A | 11/1997 | van Erven |
| 5,477,040 A | 12/1995 | Lalonde | 5,694,326 A | 12/1997 | Warn et al. |
| 5,479,171 A | 12/1995 | Schuermann | 5,701,127 A | 12/1997 | Sharpe |
| 5,482,139 A | 1/1996 | Rivalto | 5,710,887 A | 1/1998 | Chelliah et al. |
| 5,485,520 A | 1/1996 | Chaum et al. | 5,717,374 A | 2/1998 | Smith |
| 5,488,376 A | 1/1996 | Hurta et al. | 5,721,781 A | 2/1998 | Deo et al. |
| 5,489,773 A | 2/1996 | Kumar | 5,724,028 A | 3/1998 | Prokup |
| 5,489,908 A | 2/1996 | Orthmann et al. | 5,727,153 A | 3/1998 | Powell |
| 5,491,483 A | 2/1996 | D'Hont | 5,727,608 A | 3/1998 | Nusbaumer et al. |
| 5,491,484 A | 2/1996 | Schuermann | 5,729,236 A | 3/1998 | Flaxl |
| 5,491,715 A | 2/1996 | Flaxl | 5,729,697 A | 3/1998 | Schkolnick et al. |
| 5,493,291 A | 2/1996 | Bruggemann | 5,731,957 A | 3/1998 | Brennan |
| 5,493,315 A | 2/1996 | Atchley | 5,732,401 A | 3/1998 | Conway |
| 5,495,250 A | 2/1996 | Ghaem et al. | 5,739,766 A | 4/1998 | Chaloux |
| 5,499,181 A | 3/1996 | Smith | 5,742,229 A | 4/1998 | Smith |
| 5,500,651 A | 3/1996 | Schuermann | 5,748,737 A | 5/1998 | Daggar |
| 5,508,705 A | 4/1996 | Spiess | 5,751,227 A | 5/1998 | Yoshida et al. |
| 5,525,992 A | 6/1996 | Froschermeier | 5,764,789 A | 6/1998 | Pare, Jr. et al. |
| 5,525,994 A | 6/1996 | Hurta et al. | 5,770,843 A | 6/1998 | Rose et al. |
| 5,539,189 A | 7/1996 | Wilson | 5,789,732 A | 8/1998 | McMahon et al. |
| 5,541,583 A | 7/1996 | Mandelbaum | 5,790,410 A | 8/1998 | Warn et al. |
| 5,541,604 A | 7/1996 | Meier | 5,793,028 A | 8/1998 | Wagener et al. |
| 5,541,925 A | 7/1996 | Pittenger et al. | 5,793,324 A | 8/1998 | Aslanidis et al. |
| 5,543,798 A | 8/1996 | Schuermann | 5,796,832 A | 8/1998 | Kawan |
| 5,546,523 A | 8/1996 | Gatto | 5,797,470 A | 8/1998 | Bohnert et al. |
| 5,548,291 A | 8/1996 | Meier et al. | 5,798,709 A | 8/1998 | Flaxl |
| 5,550,358 A | 8/1996 | Tait et al. | 5,798,931 A | 8/1998 | Kaehler |
| 5,550,536 A | 8/1996 | Flaxl | 5,805,082 A | 9/1998 | Hassett |
| 5,550,548 A | 8/1996 | Schuermann | 5,809,142 A | 9/1998 | Hurta et al. |
| 5,552,789 A | 9/1996 | Schuermann | 5,819,234 A | 10/1998 | Slavin et al. |
| 5,554,984 A | 9/1996 | Shigenaga et al. | 5,821,525 A | 10/1998 | Takebayashi |
| 5,557,268 A | 9/1996 | Hughes et al. | 5,825,302 A | 10/1998 | Stafford |
| 5,557,279 A | 9/1996 | D'Hont | 5,832,083 A | 11/1998 | Iwayama et al. |
| 5,557,529 A | 9/1996 | Warn et al. | 5,832,377 A | 11/1998 | Soenen et al. |
| 5,561,430 A | 10/1996 | Knebelkamp | 5,832,457 A | 11/1998 | O'Brien et al. |
| 5,572,555 A | 11/1996 | Soenen et al. | 5,841,364 A | 11/1998 | Hagl et al. |
| 5,578,808 A | 11/1996 | Taylor | 5,842,188 A | 11/1998 | Ramsey et al. |
| 5,587,712 A | 12/1996 | Boone et al. | 5,850,077 A | 12/1998 | Tognazzini |
| 5,590,038 A | 12/1996 | Pitroda | 5,850,187 A | 12/1998 | Carrender et al. |
| 5,591,949 A | 1/1997 | Bernstein | 5,856,809 A | 1/1999 | Schoepfer |

| | | | | | | |
|---|---|---|---|---|---|---|
| 5,857,175 | A | 1/1999 | Day et al. | 6,039,244 | A | 3/2000 | Finsterwald |
| 5,857,501 | A | 1/1999 | Kelerich et al. | 6,039,247 | A | 3/2000 | Reccia et al. |
| 5,859,414 | A | 1/1999 | Grimes et al. | 6,041,314 | A | 3/2000 | Davis |
| 5,859,416 | A | 1/1999 | Gatto | 6,044,349 | A | 3/2000 | Tolopka et al. |
| 5,859,419 | A | 1/1999 | Wynn | 6,045,040 | A | 4/2000 | Streicher et al. |
| 5,859,587 | A | 1/1999 | Alicot et al. | 6,046,668 | A | 4/2000 | Forster |
| 5,859,779 | A | 1/1999 | Giordano et al. | 6,046,680 | A | 4/2000 | Soenen et al. |
| 5,862,183 | A | 1/1999 | Lazaridis et al. | 6,046,683 | A | 4/2000 | Pidwerbetsky et al. |
| 5,862,222 | A | 1/1999 | Gunnarsson | 6,055,521 | A | 4/2000 | Ramsey et al. |
| 5,864,323 | A | 1/1999 | Berthon | 6,055,573 | A | 4/2000 | Gardenswartz et al. |
| 5,867,100 | A | 2/1999 | D'Hont | 6,061,344 | A | 5/2000 | Wood, Jr. |
| 5,868,179 | A | 2/1999 | Hartsell, Jr. | 6,061,665 | A | 5/2000 | Bahreman |
| 5,870,031 | A | 2/1999 | Kaiser et al. | 6,064,320 | A | 5/2000 | d'Hont et al. |
| 5,873,025 | A | 2/1999 | Evans et al. | 6,067,297 | A | 5/2000 | Beach |
| 5,873,068 | A | 2/1999 | Beaumont et al. | 6,068,030 | A | 5/2000 | Tatsuno |
| 5,874,896 | A | 2/1999 | Lowe et al. | 6,070,147 | A | 5/2000 | Harms et al. |
| 5,878,403 | A | 3/1999 | DeFrancesco et al. | 6,070,156 | A | 5/2000 | Hartsell, Jr. |
| 5,884,271 | A | 3/1999 | Pitroda | 6,072,801 | A | 6/2000 | Wood, Jr. et al. |
| 5,890,520 | A | 4/1999 | Johnson, Jr. | 6,073,840 | A | 6/2000 | Marion |
| 5,892,706 | A | 4/1999 | Shimizu et al. | 6,078,251 | A | 6/2000 | Landt et al. |
| 5,895,457 | A | 4/1999 | Kurowski et al. | 6,078,888 | A | 6/2000 | Johnson, Jr. |
| 5,901,303 | A | 5/1999 | Chew | 6,079,621 | A | 6/2000 | Vardanyan et al. |
| 5,902,985 | A | 5/1999 | Bos et al. | 6,082,618 | A | 7/2000 | Brown |
| 5,906,228 | A | 5/1999 | Keller | 6,084,530 | A | 7/2000 | Pidwerbetsky et al. |
| 5,913,180 | A | 6/1999 | Ryan | 6,085,805 | A | 7/2000 | Bates |
| 5,915,243 | A | 6/1999 | Smolen | 6,087,954 | A | 7/2000 | McSpadden et al. |
| 5,917,913 | A | 6/1999 | Wang | 6,089,284 | A * | 7/2000 | Kaehler et al. ................ 141/94 |
| 5,918,211 | A | 6/1999 | Sloane | 6,092,052 | A | 7/2000 | Ziarno |
| 5,923,016 | A | 7/1999 | Fredregill et al. | 6,098,048 | A | 8/2000 | Dashefsky et al. |
| 5,923,572 | A | 7/1999 | Pollock | 6,098,879 | A | 8/2000 | Terranova |
| 5,924,080 | A | 7/1999 | Johnson | 6,104,290 | A | 8/2000 | Naguleswaran |
| 5,926,531 | A | 7/1999 | Petite | 6,104,291 | A | 8/2000 | Beauvillier et al. |
| 5,929,801 | A | 7/1999 | Aslanidis et al. | 6,105,006 | A | 8/2000 | Davis et al. |
| 5,933,096 | A | 8/1999 | Tsuda | 6,109,525 | A | 8/2000 | Blomqvist et al. |
| 5,933,812 | A | 8/1999 | Meyer et al. | 6,112,152 | A | 8/2000 | Tuttle |
| 5,948,116 | A | 9/1999 | Aslanidis et al. | 6,112,981 | A | 9/2000 | McCall |
| 5,949,043 | A | 9/1999 | Hayashida | 6,116,298 | A | 9/2000 | Haimovich et al. |
| 5,952,922 | A | 9/1999 | Shober | 6,116,505 | A | 9/2000 | Withrow |
| 5,955,969 | A | 9/1999 | D'Hont | 6,118,189 | A | 9/2000 | Flaxl |
| 5,956,259 | A | 9/1999 | Hartsell, Jr. et al. | 6,119,105 | A | 9/2000 | Williams |
| 5,962,829 | A | 10/1999 | Yoshinaga | 6,129,274 | A | 10/2000 | Suzuki |
| 5,969,691 | A | 10/1999 | Myers | 6,130,602 | A | 10/2000 | O'Toole et al. |
| 5,970,148 | A | 10/1999 | Meier | 6,130,623 | A | 10/2000 | MacLellan et al. |
| 5,970,474 | A | 10/1999 | LeRoy et al. | 6,133,834 | A | 10/2000 | Eberth et al. |
| 5,971,042 | A | 10/1999 | Hartsell, Jr. | 6,136,357 | A | 10/2000 | Dietl |
| 5,974,396 | A | 10/1999 | Anderson et al. | 6,138,911 | A | 10/2000 | Fredregill et al. |
| 5,979,753 | A | 11/1999 | Roslak | 6,138,912 | A | 10/2000 | Mitsuno |
| 5,979,757 | A | 11/1999 | Tracy et al. | 6,140,941 | A | 10/2000 | Dwyer et al. |
| 5,988,510 | A | 11/1999 | Tuttle et al. | 6,145,741 | A | 11/2000 | Wisdom et al. |
| 5,991,410 | A | 11/1999 | Albert et al. | 6,149,055 | A | 11/2000 | Gatto |
| 5,991,749 | A | 11/1999 | Morrill, Jr. | 6,157,230 | A | 12/2000 | O'Toole et al. |
| 5,993,047 | A | 11/1999 | Novogrod et al. | 6,157,871 | A | 12/2000 | Terranova |
| 5,995,015 | A | 11/1999 | DeTemple et al. | 6,160,734 | A | 12/2000 | Henderson et al. |
| 5,999,596 | A | 12/1999 | Walker et al. | 6,167,236 | A | 12/2000 | Kaiser et al. |
| 6,000,607 | A | 12/1999 | Ohki et al. | 6,169,483 | B1 | 1/2001 | Ghaffari et al. |
| 6,000,608 | A | 12/1999 | Dorf | 6,177,858 | B1 | 1/2001 | Raimbault et al. |
| 6,012,049 | A | 1/2000 | Kawan | 6,177,860 | B1 | 1/2001 | Cromer et al. |
| 6,014,634 | A | 1/2000 | Scroggie et al. | 6,179,206 | B1 | 1/2001 | Matsumori |
| 6,016,476 | A | 1/2000 | Maes et al. | 6,182,893 | B1 | 2/2001 | Greene et al. |
| 6,018,718 | A | 1/2000 | Walker et al. | 6,184,846 | B1 | 2/2001 | Myers et al. |
| 6,021,399 | A | 2/2000 | Demers et al. | 6,185,307 | B1 | 2/2001 | Johnson, Jr. |
| 6,024,142 | A | 2/2000 | Bates | 6,191,705 | B1 | 2/2001 | Oomen et al. |
| 6,025,780 | A | 2/2000 | Bowers et al. | 6,195,541 | B1 * | 2/2001 | Griffith ...................... 455/406 |
| 6,025,799 | A | 2/2000 | Ho et al. | 6,198,764 | B1 | 3/2001 | Schuermann et al. |
| 6,026,375 | A | 2/2000 | Hall et al. | 6,213,391 | B1 | 4/2001 | Lewis |
| 6,026,868 | A | 2/2000 | Johnson, Jr. | 6,215,437 | B1 | 4/2001 | Schurmann et al. |
| 6,032,126 | A | 2/2000 | Kaehler | 6,219,543 | B1 | 4/2001 | Myers et al. |
| 6,032,134 | A | 2/2000 | Weissman | 6,219,613 | B1 | 4/2001 | Terrier et al. |
| 6,032,703 | A | 3/2000 | Baker et al. | 6,239,675 | B1 | 5/2001 | Flaxl |
| 6,036,090 | A | 3/2000 | Rahman et al. | 6,249,227 | B1 | 6/2001 | Brady et al. |
| 6,037,879 | A | 3/2000 | Tuttle | 6,257,486 | B1 | 7/2001 | Teicher et al. |
| 6,038,549 | A | 3/2000 | Davis et al. | 6,259,367 | B1 | 7/2001 | Klein |
| 6,038,551 | A | 3/2000 | Barlow et al. | 6,263,316 | B1 | 7/2001 | Khan et al. |

| | | | | | | |
|---|---|---|---|---|---|---|
| 6,263,319 | B1 | 7/2001 | Leatherman | EP | 0 907 134 A1 | 4/1999 |
| 6,264,103 | B1 | 7/2001 | Stanley | EP | 907938 | 4/1999 |
| 6,275,476 | B1 | 8/2001 | Wood, Jr. | EP | 913796 | 5/1999 |
| 6,282,186 | B1 | 8/2001 | Wood, Jr. | EP | 925552 | 6/1999 |
| 6,282,516 | B1 | 8/2001 | Giuliani | EP | 0 930 590 A1 | 7/1999 |
| 6,289,324 | B1 | 9/2001 | Kawan | EP | 943584 | 9/1999 |
| 6,292,786 | B1 | 9/2001 | Deaton et al. | EP | 955612 | 11/1999 |
| 6,298,330 | B1 | 10/2001 | Gardenswartz et al. | EP | 957580 | 12/1999 |
| 6,302,527 | B1 | 10/2001 | Walker | EP | 974940 | 1/2000 |
| 6,307,847 | B1 | 10/2001 | Wood, Jr. | EP | 1017614 | 7/2000 |
| 6,311,162 | B1 | 10/2001 | Reichwein et al. | EP | 0795165 | 9/2000 |
| 6,311,167 | B1 | 10/2001 | Davis et al. | EP | 1039408 | 9/2000 |
| 6,311,214 | B1 | 10/2001 | Rhoads | EP | 1052603 | 11/2000 |
| 6,313,737 | B1 | 11/2001 | Freeze et al. | FR | 2600318 | 6/1986 |
| 6,317,028 | B1 | 11/2001 | Valiulis | FR | 2764099 | 12/1998 |
| 6,321,894 | B1 | 11/2001 | Johnsson | GB | 2222714 | 3/1990 |
| 6,321,984 | B1 | 11/2001 | McCall et al. | GB | 2224418 | 5/1990 |
| 6,325,285 | B1 | 12/2001 | Baratelli | GB | 2227209 | 7/1990 |
| 6,326,934 | B1 | 12/2001 | Kinzie | GB | 2229845 | 10/1990 |
| 6,332,025 | B2 | 12/2001 | Takahashi et al. | GB | 2245865 | 1/1992 |
| 6,332,128 | B1 | 12/2001 | Nicholson | GB | 2252847 | 8/1992 |
| 6,334,575 | B1 | 1/2002 | Su-Hui | GB | 2253591 | 9/1992 |
| 6,335,686 | B1 | 1/2002 | Goff et al. | GB | 2255046 | 10/1992 |
| 6,340,116 | B1 | 1/2002 | Cecil et al. | GB | 2257092 | 1/1993 |
| 6,343,241 | B1 | 1/2002 | Kohut et al. | GB | 2257944 | 1/1993 |
| 6,359,570 | B1 | 3/2002 | Adcox et al. | GB | 2266794 | 11/1993 |
| 6,360,138 | B1 | 3/2002 | Coppola et al. | GB | 2267683 | 12/1993 |
| 6,360,208 | B1 | 3/2002 | Ohanian et al. | GB | 2279611 | 1/1995 |
| 6,390,151 | B1 * | 5/2002 | Christman et al. .......... 141/231 | GB | 2279612 | 1/1995 |
| 6,618,362 | B1 | 9/2003 | Terranova | GB | 2279613 | 1/1995 |
| 2001/0013011 | A1 | 8/2001 | Day et al. | GB | 2329301 | 3/1999 |
| 2001/0020198 | A1 | 9/2001 | Wilson | JP | 57-32144 | 2/1982 |
| 2001/0029488 | A1 | 10/2001 | Takeshima et al. | JP | 223465 | 2/1990 |
| 2001/0034565 | A1 | 10/2001 | Leatherman | JP | 02046061 | 2/1990 |
| 2001/0037249 | A1 | 11/2001 | Fitzgerald et al. | JP | 04024153 | 1/1992 |
| 2001/0039512 | A1 | 11/2001 | Nicholson | JP | 5229599 | 5/1993 |
| 2001/0045460 | A1 | 11/2001 | Reynolds et al. | JP | 06103178 | 4/1994 |
| 2001/0051920 | A1 | 12/2001 | Joao et al. | JP | 668317 | 6/1994 |
| 2002/0002538 | A1 | 1/2002 | Ling | JP | 6176251 | 6/1994 |
| 2002/0011517 | A1 | 1/2002 | Namekawa et al. | JP | 08316717 | 11/1996 |
| 2002/0011519 | A1 | 1/2002 | Shults, III | JP | 09325993 | 12/1997 |
| 2002/0014952 | A1 | 2/2002 | Terranova | JP | 2000030150 | 1/2000 |
| 2002/0016740 | A1 | 2/2002 | Ogasawara | JP | 2000134220 | 5/2000 |
| 2002/0019811 | A1 | 2/2002 | Lapsley et al. | WO | WO 84/00869 | 3/1984 |
| 2002/0022967 | A1 | 2/2002 | Ohkado | WO | WO 90/08365 | 7/1990 |
| 2002/0026380 | A1 | 2/2002 | Su | WO | WO 92/18977 | 10/1992 |
| 2002/0032649 | A1 | 3/2002 | Selvarajan | WO | WO 93/00661 | 1/1993 |
| 2002/0032664 | A1 | 3/2002 | Ikuta | WO | WO 94/03391 | 2/1994 |
| 2002/0034978 | A1 | 3/2002 | Legge et al. | WO | WO 94/05592 | 3/1994 |
| 2002/0035622 | A1 | 3/2002 | Barber | WO | WO 94/06031 | 3/1994 |
| | | | | WO | WO 94/16396 | 7/1994 |
| | | FOREIGN PATENT DOCUMENTS | | WO | WO 95/14612 | 6/1995 |
| | | | | WO | WO 95/16971 | 6/1995 |
| DE | | 4012842 | 10/1991 | WO | WO 95/32919 | 12/1995 |
| DE | | 4013147 | 10/1991 | WO | WO 96/27891 | 9/1996 |
| DE | | 4107803 | 9/1992 | WO | WO 96/28789 | 9/1996 |
| DE | | 19646153 | 5/1998 | WO | WO 96/28791 | 9/1996 |
| DE | | 19701167 | 7/1998 | WO | WO 96/39351 | 12/1996 |
| EP | | 0 040 544 A2 | 5/1981 | WO | WO 97/21626 | 6/1997 |
| EP | | 0 204 542 A2 | 6/1986 | WO | WO 97/24689 | 7/1997 |
| EP | | 0 349 316 A1 | 6/1989 | WO | WO 97/35284 | 9/1997 |
| EP | | 391559 | 10/1990 | WO | WO 98/10363 | 3/1998 |
| EP | | 469762 | 2/1992 | WO | WO 98/21713 | 5/1998 |
| EP | | 503782 | 9/1992 | WO | WO 98/38601 | 9/1998 |
| EP | | 609694 | 8/1994 | WO | WO 98/55952 | 12/1998 |
| EP | | 644515 | 3/1995 | WO | WO 99/04374 | 1/1999 |
| EP | | 665971 | 8/1995 | WO | WO 99/12116 | 3/1999 |
| EP | | 0 696 021 A2 | 2/1996 | WO | WO 99/16700 | 4/1999 |
| EP | | 0 723 241 A1 | 7/1996 | WO | WO 99/16701 | 4/1999 |
| EP | | 0 725 376 A2 | 8/1996 | WO | WO 99/16702 | 4/1999 |
| EP | | 793086 | 9/1997 | WO | WO 99/16703 | 4/1999 |
| EP | | 0 887 776 A1 | 12/1998 | WO | WO 99/41717 | 8/1999 |
| EP | | 888593 | 1/1999 | WO | WO 99/42962 | 8/1999 |

| | | |
|---|---|---|
| WO | WO 99/53409 | 10/1999 |
| WO | WO 00/07121 | 2/2000 |
| WO | WO 00/12362 | 3/2000 |
| WO | WO 00/46101 | 9/2000 |
| WO | WO 00/52655 | 9/2000 |
| WO | WO 00/55752 | 9/2000 |
| WO | WO 00/58917 | 10/2000 |
| WO | WO 00/72463 | 11/2000 |
| WO | WO 01/22304 | 3/2001 |
| WO | WO 03/058391 | 7/2003 |
| WO | WO 03/058947 | 7/2003 |

OTHER PUBLICATIONS

Lobred, P., "BP Plans Robotic Pump, Mobil May Follow Suit," U.S. Oil Week, Oct. 1997, vol. 34 No. 43, pp. 1-2.

Koch, W.H., "Robotic Fueling," Petroleum Equipment & Technology, Sep.-Oct. 1997, pp. 14, 16-18, 49.

Autofill Europe AB, "No, She Is Not Drawing Cash From Her Bank Account. She Is Filling Her Car Up."; "Autofill. Another Breakthrough In Man's Quest To Eliminate Life's Everyday Problems."; "Faster. Cleaner. Safer. And Right Now."; "Autofill. It Fills Much More Than Just Fuel. It Fills A Need.", (Undated).

Callanan, J., "Can Fueling Developments In Dispenser Technology Aim To Make Fueling Up A 'Gas' For Motorists . . . ," The Journal of Petroleum Marketing, Jul. 1997, pp. 3, 16-18.

M-Commerce Wallet-Like Transactions, (Undated).

Venture Development Corporation, "Retail Automation Equipment: A Vertical Market Analysis Of Usage And Plans For Wireless, Emergeing, And Traditional Technologies," Pub Time: Jul. 2002 (via www.the-infoshop.com).

Dove Consulting, Indutry Report, "Trasponders. The New Way to Pay?," Apr. 2001, pp. 1-4.

Ingenico, *Evolution Of Payment At The Point Of Sale*, Printed 2002.

Texas Instruments, "Customer Loyalty Mechanism With TI*RFID," 2000 (via www.ti.com/tiris/docs/aolutions/pos/loyalty.htm).

ISIT.com, "The Cutting Edge Of RFID Technology And Applications For Manufacturing And Distribution," 2001 (via www.isit.com/feature.cfm?articleid=3516&tech=AIDC).

"RFID Links On The Web," (via http://home.att.net/?randall.j.jackson/rfidlinks.htm).

Texas Instruments, *TRIS News*, 1998, Issue No. 18.

"Budget to Test Automated Return System" (Article).

Identification Devices, Inc., "Automated Vehicle Identification System I.D.,", Nov. 1986 (brochure).

*Speedpass* Advertisement: "A Legacy of Firsts", *Scientific American*, pp. 89-92.

U.S. Appl. No. 08/768,723, filed Dec. 18, 1996.

U.S. Appl. No. 09/224,027, filed Dec. 31, 1998.

Quinlan, "Radio Tags—The New Identifiers," Handling & Shipping Management, v. 28, pp. 90-93 (1885).

US 4,926,494, 05/1990, Potter (withdrawn)

\* cited by examiner

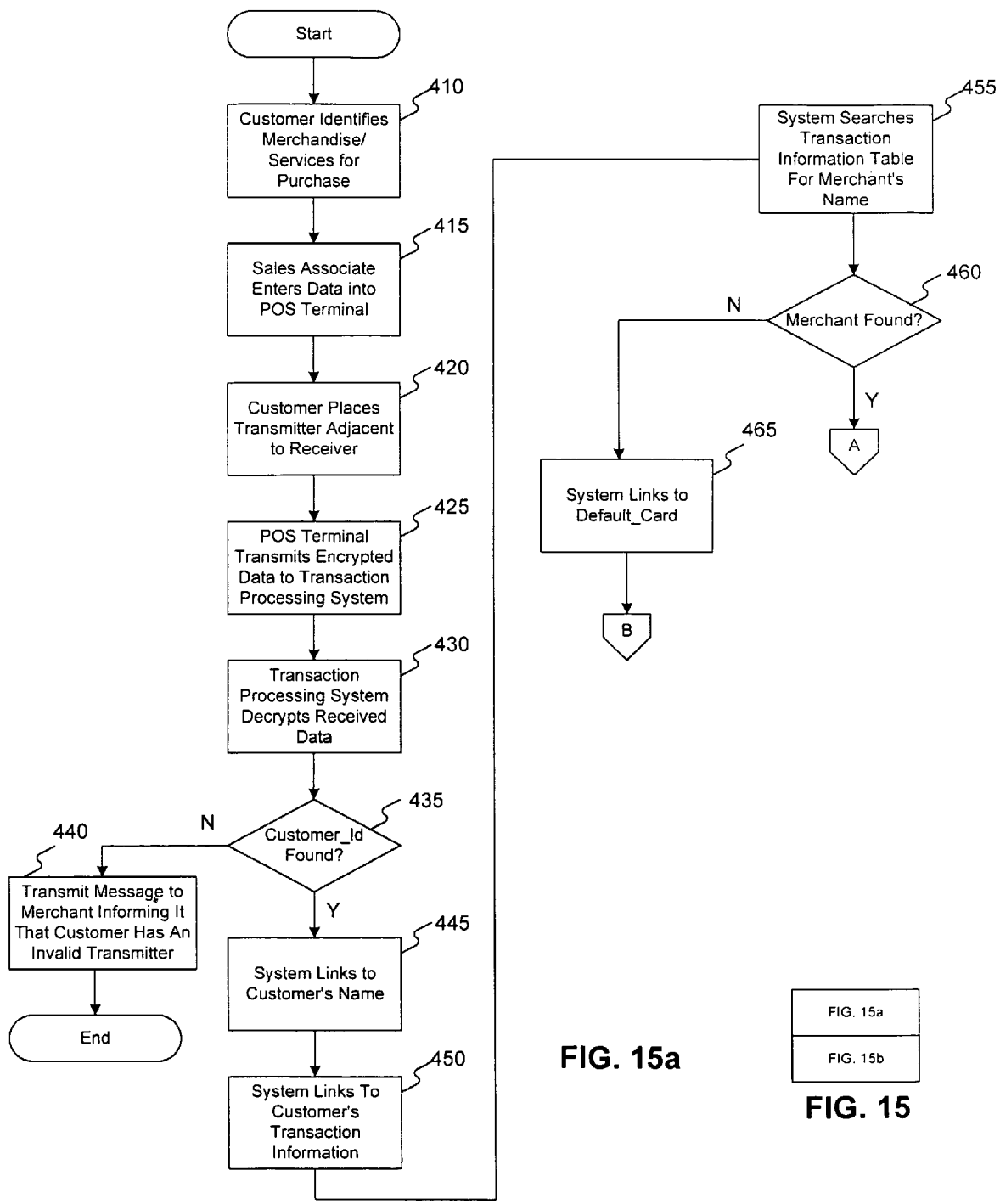

US 7,571,139 B1

SYSTEM AND METHOD FOR PROCESSING FINANCIAL TRANSACTIONS

This application claims priority in U.S. Provisional Application No. 60/120,760, entitled "System and Method for Processing Financial Transactions," filed Feb. 19, 1999.

FIELD OF THE INVENTION

The invention relates generally to retail transactions and, more particularly, to systems and methods for monitoring consumer behavior and for providing a secure, electronic payment in exchange for goods and services.

DESCRIPTION OF THE RELATED ART

Retail store chains survive on high sales volumes and low profit margins. Accordingly, retail professionals are constantly searching for cost-effective mechanisms to encourage consumers to shop at their retail stores and for efficient low-cost methods to process completed retail transactions. In the past, the most common approach utilized by retailers for motivating customers to shop in a particular establishment was to provide purchasing incentives to their customers, usually in the form of printed discount coupons. These coupons have been distributed to customers either through mass mailings or in a more focused manner, based on a customer's previous purchasing habits. Coupons have also been given to customers in retail stores, either from kiosks or at the checkout stand, in response to the customer's purchase of some preselected item or items.

Retailers have come to the realize that the more efficient approach to encouraging consumers to shop at their retail store is identify loyal customers and to offer incentives to them in response to their continued loyalty. Implementing systems that track customer purchasing trends for the purpose of identifying loyal customers can be prohibitively expensive. Furthermore, promoting retail store loyalty is a time-consuming process that necessitates determining consumer needs, which vary across demographic boundaries, and then providing the goods that satisfy those needs. Unfortunately, the process of analyzing collected consumer data is also expensive, time-consuming, and of limited use. Regional and national consumer demographics data available from Nielson and other agencies regarding consumer product movement is predictably too general to be useful to specific retailers. Additionally, these agencies do not address product movement demographics that would allow retailers to learn the particular needs and buying habits of people purchasing specific products.

An alternative to the traditional loyalty program that does not require demographics data is one in which increased sales and customer loyalty is obtained through a reward system. For example, the airline industry rewards loyal customers using frequent flyer programs. Attempts have also been made to develop "frequent shopper" marketing and sales promotion services in retail sales. Other retailers have experimented with programs that reward frequent shoppers by distributing cards to customers who regularly purchase name brand goods manufactured by a particular vendor. Cards are used at participating retail stores to identify the customer and record purchases of particular brand goods and to award points based on the number of brand good purchases. Points are accumulated, and gifts are given to the card member based on a predetermined criteria.

Unfortunately, none of these services completely address or meet the needs and interests of modern retailers. For example, many of these existing programs encourage "brand loyalty" or "retail store loyalty," but do not permit the retailer to reward across brands (co-branding) or across retailers. Specifically, none of these services allow a retail store owner to reward purchase of Coca Cola™ products with a discount on Frito Lay™ snacks. Furthermore, none of these services allow a Wendy's™ franchise owner to reward the purchase of a predetermined number of Wendy's products with a complementary oil change at Jiffy Lube™ for example. Moreover, none of these services allow a retailer to associate particular consumer groups with specific consumer needs. For example, in the grocery retail business in the United States, double income families are pressed for time and show a trend toward less time being spent shopping and preparing meals. Retail grocers are challenged to provide incentives to encourage these kinds of shoppers into their stores. Retailers and consumers alike could benefit from systems that allow retailers to identify health conscious consumers and to offer incentives that appeal to the consumer's need for natural and/or healthy foods. Identifying those shoppers having special dietary needs, e.g. medical problems and then marketing to those dietary needs may be particularly advantageous to retailers. Providing products that appeal to certain groups instead of offering generic grocery items may also be profitable.

Complicating the reality that modern-day loyalty programs do not meet the needs of the modern retailer is the fact that an increasing number of retail store customers also own personal computers with many having access to computer network services that provide connections to the Internet. Although some computer sites connected to the World Wide Web have begun to offer "online" shopping services, and some services have proposed to deliver discount coupons through a computer network, the full potential of online delivery of incentives has not been realized.

Aside from restricting the growth of loyalty programs, it is widely suspected that the emergence of the World Wide Web has also created an avenue for increased consumer exposure to fraudulent "online" transactions. Internet-based payment solutions give unprecedented access to personal information by uninvited eavesdroppers. Conducting these types of transactions over the Internet consequently requires additional security measures that are not found in conventional transaction processing networks. This additional requirement is necessitated by the fact that Internet communication is performed over publicly-accessible, unsecured communication lines in stark contrast to the private, dedicated phone line service utilized between a traditional "brick and mortar" merchant and a credit authorizing organization. As an example, FIG. 1 is a diagrammatic representation of a conventional system 10 for processing retail non-cash transactions. A customer enters a merchant store 12 and makes a purchase using a credit card issued for example, by one of a plurality of credit card issuing agencies such as a bank or payment processing system 16. Merchant store 12 may be one of a large number of similar stores, all owned or managed by a common parent corporation or headquarters 14. A record of each credit card transaction, regardless of which card was used, is transmitted by a dedicated communications channel 13 to merchant corporation headquarters 14 of the retail outlet 12. A processor at merchant corporation headquarters 14 analyzes the credit card transaction records received and then routes the transaction, along a second dedicated communications channel 15, to an appropriate payment processing system 16, according to the identification of the particular credit card used in the original transaction.

Compare that to the situation that arises when an online consumer purchases goods and services over the Internet. As shown in FIG. 2, when a consumer 18 transmits credit card information to an online merchant 24, the information passes through countless servers 21 and routers 22 on its way to the online merchant 24. Along the way, the information can easily be scanned and scrutinized by numerous interlopers (not shown). Thus, it is critical that any retail processing system utilizing the Internet or any other unsecured network as a communication medium, must employ some form of security or encryption.

In view of the shortcomings of currently available online transaction processing systems and methods, it is desirable to provide a system and method that increases customer convenience and security. It is also desirable to provide a system and method that allows merchants to easily compile demographics data for use in designing customer loyalty and incentive programs.

SUMMARY OF THE INVENTION

The present invention satisfies the above-described need by providing a system and method for processing consumer transactions. In the system of the present invention, a consumer located in a retail establishment identifies goods or services to be purchased and then communicates payment information to the merchant by transmitting an identification signal via a wireless customer transceiver to a merchant transceiver coupled to a point of sale (POS) device. Once the merchant transceiver captures the customer ID, it passes it to a POS device that then combines the customer ID, merchant ID and transaction data into an authorization request. The POS device then transmits the data to a transaction processing system (host computer) where the customer's payment method is identified. For payment methods requiring authorization, a request for authorization transmitted to the appropriate payment processing center. Once the payment processing center authorizes the transaction, it transmits an authorization code back to the POS device via the transaction processing system. Since the system never transmits a customer's credit card or debit card number across an unsecured link, it provides a heightened degree of security over prior art systems. Also, by communicating with the merchant via a wireless customer transceiver, the system increases customer confidence that their credit card number or other payment data will not be impermissibly accessed and fraudulently utilized by nefarious retail store employees. The system also provides a much greater degree of convenience to participating customers since it allows them to preassign specific payment methods to specific retail establishments, and to have the preassigned payment methods automatically selected by the transaction processing system whenever the customer utilizes his/her wireless customer transceiver in the merchant's retail establishment.

The system also provides unprecedented benefits to merchants. Most importantly, the transaction processing system which is networked to the merchant's in-store POS devices, and to the merchant's on-line shopping network, allows merchants to quickly and efficiently process non-cash transactions for in-store and on-line customers, using the same system. Also, since a merchant can track the purchasing history of each customer who uses the transaction processing system to authorize payments, the merchant may provide for targeted incentives to the customer based on his or her prior purchases, regardless of their method of origination (in-store or on-line). Moreover, the transaction processing system's association with a plurality of different merchants allows a merchant associated with the system to couple its incentive program with that of another participating merchant, thereby allowing customer loyalty to be awarded across multiple merchants.

In another aspect, the present invention provides a method for securely processing financial transactions over the Internet or other unsecured network. The method includes utilizing a wireless customer transceiver to transmit a customer's ID to a transceiver coupled to the customer's computer. The computer identifies the desired product from a merchant's online WEB site and transmits the customer ID and the product information to the transaction processing system. As in the case of the preferred embodiment, the transaction processing system identifies the selected payment method and transmits the authorization request to the appropriate payment processing center. Once the transaction processor authorizes the transaction, it transmits an authorization code to the online merchant and the merchandise is then delivered to the customer's address. In addition to transmitting a transaction authorization, the transaction processing system also may transmit identification information and other data unique to the associated customer in the absence of a retail transaction. An additional embodiment of a transaction processing system includes a system capable of transmitting instructions to a vendor based on receipt of a customer ID (e.g., issue a ticket to the customer, provide access to the customer, etc.)

In yet another aspect, the present invention provides a method for associating a customer's preferences with his or her customer ID. For example, a fast food restaurant chain may choose to collect and store a description of a customer's favorite meal so that when the customer transmits his ID to a merchant transceiver located in the fast food restaurant, his favorite meal is ordered and payment processing occurs, without the customer uttering a single word.

To achieve these and other advantages, and in accordance with the purpose of the invention as embodied and broadly described, the invention provides a system for processing retail transactions. The system comprises a wireless customer transceiver preprogrammed with a unique customer/transmitter ID number, and a merchant transceiver that captures the customer/transmitter ID and forwards it to an associated POS device. The POS device receives transaction data via an input device and combines the transaction data with the received ID signal from the reader to form an authorization request. At least a portion of the authorization request may be encrypted to further enhance security. The POS device transmits the authorization request over a communications channel to the transaction processing system that includes a processor and a customer information database. The customer information database includes a plurality of customer entries with associated transaction processing attributes. The processor receives the authorization request, decrypts it (if necessary) and transmits it to the payment processing system in accordance with the customer's predetermined choice of payment method. The processor also stores data derived from a transaction entry associated with the customer ID. In addition to processing transactions, the system facilitates the collection and analysis of comprehensive demographics and purchasing data for managing consumer loyalty programs and performing trend analysis of consumer purchasing trends.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention. The objectives and other advantages of the invention will be realized and attained by the methods, systems, and apparatus particularly pointed out in the written description and claims hereof, as well as the accompanying drawings.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF A PREFERRED EMBODIMENT

Figure 1:
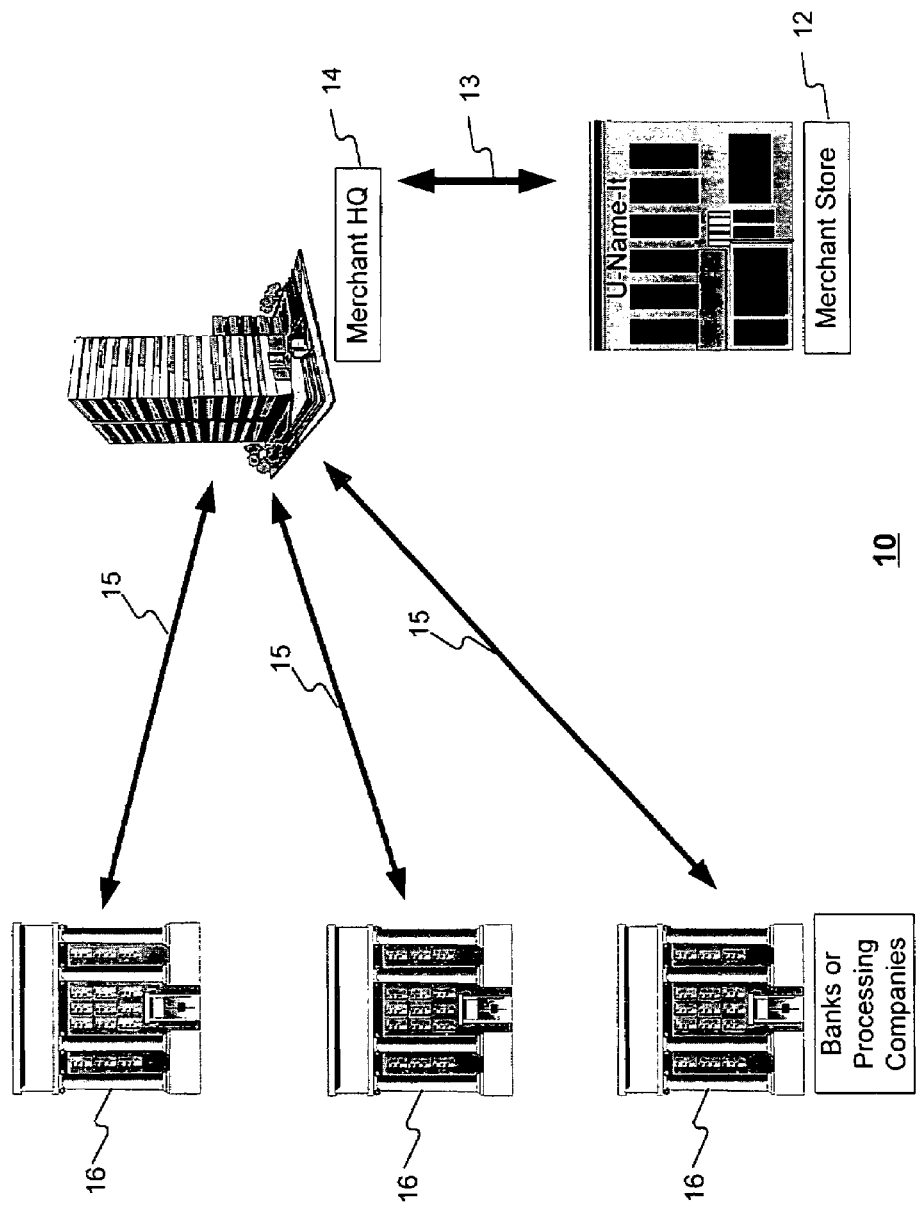
FIG. 1 is a diagram illustrating a conventional retail credit card transaction processing system.
Figure 2:
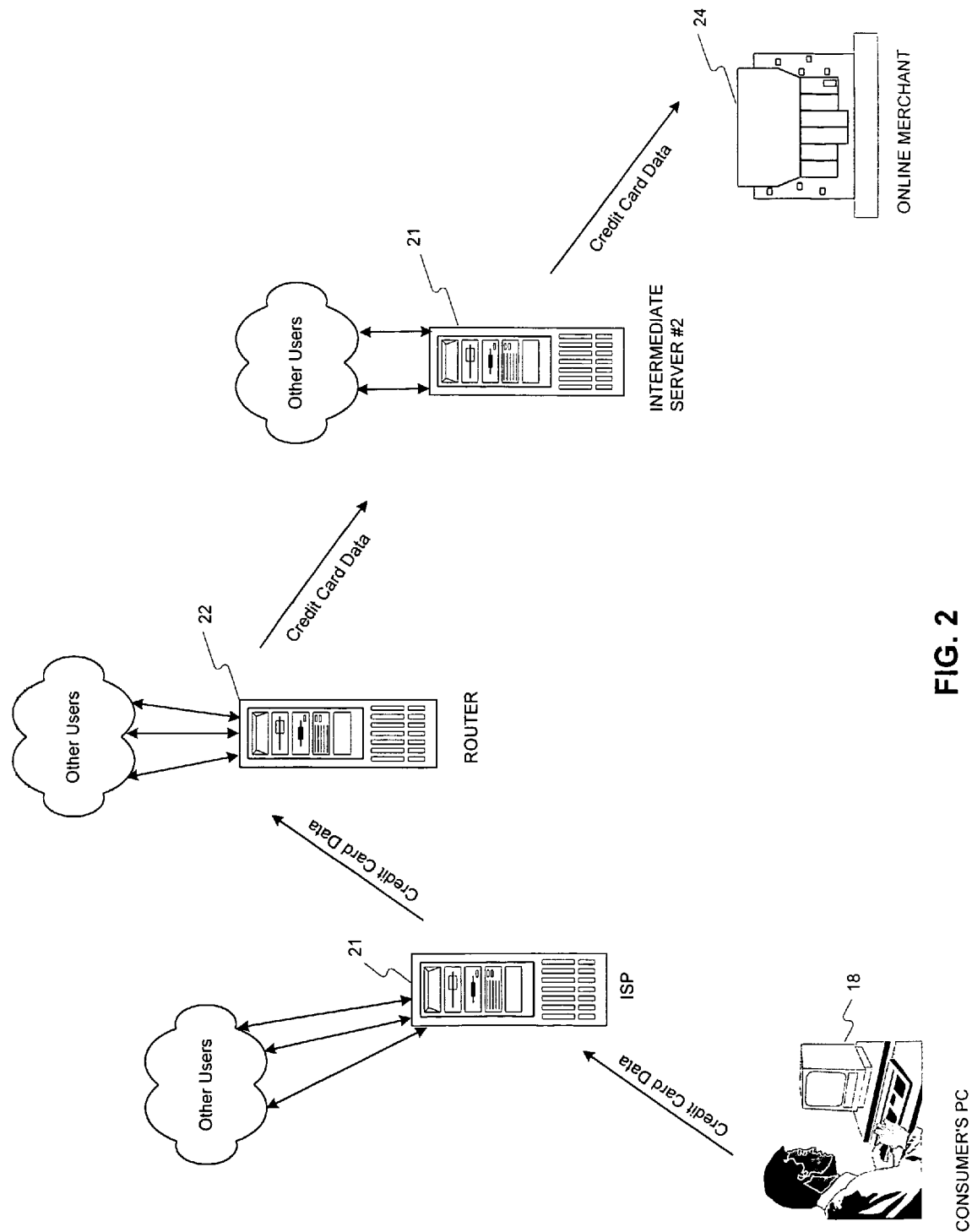
FIG. 2 is a diagram illustrating a conventional online computer system for purchasing goods and services over the Internet.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

To achieve these and other advantages, and in accordance with the purpose of the invention as embodied and broadly described, the invention provides a system for processing retail transactions. The system comprises a customer transceiver preprogrammed with a unique customer/transmitter ID number, and a merchant transceiver that receives a customer identification signal from the customer transceiver and then forwards the received customer ID signal to an associated POS device. The POS device receives transaction data via an input device and combines the transaction data with the customer ID signal to form an authorization request, in those cases when the payment method requires an authorization. The POS device transmits the authorization request over a communications channel to a transaction processing system that includes a processor and a customer information database comprised of a plurality of customer entries with associated transaction processing attributes. The processor receives the authorization request and transmits it to the payment processing system dictated by the customer's payment choice for the transaction. The processor also stores data derived from a transaction entry associated with the customer ID. In addition to processing transactions, the system facilitates the collection and analysis of comprehensive demographics and purchasing data for managing consumer loyalty programs and performing trend analysis of consumer purchasing trends.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, workstations, or personal computers are connected via communication links of various types. In a client server arrangement, programs and data, many in the form of objects, are made available by various members of the system.

Referring now to the remaining figures, corresponding reference characters refer to corresponding elements, wherever possible.

Figure 3:
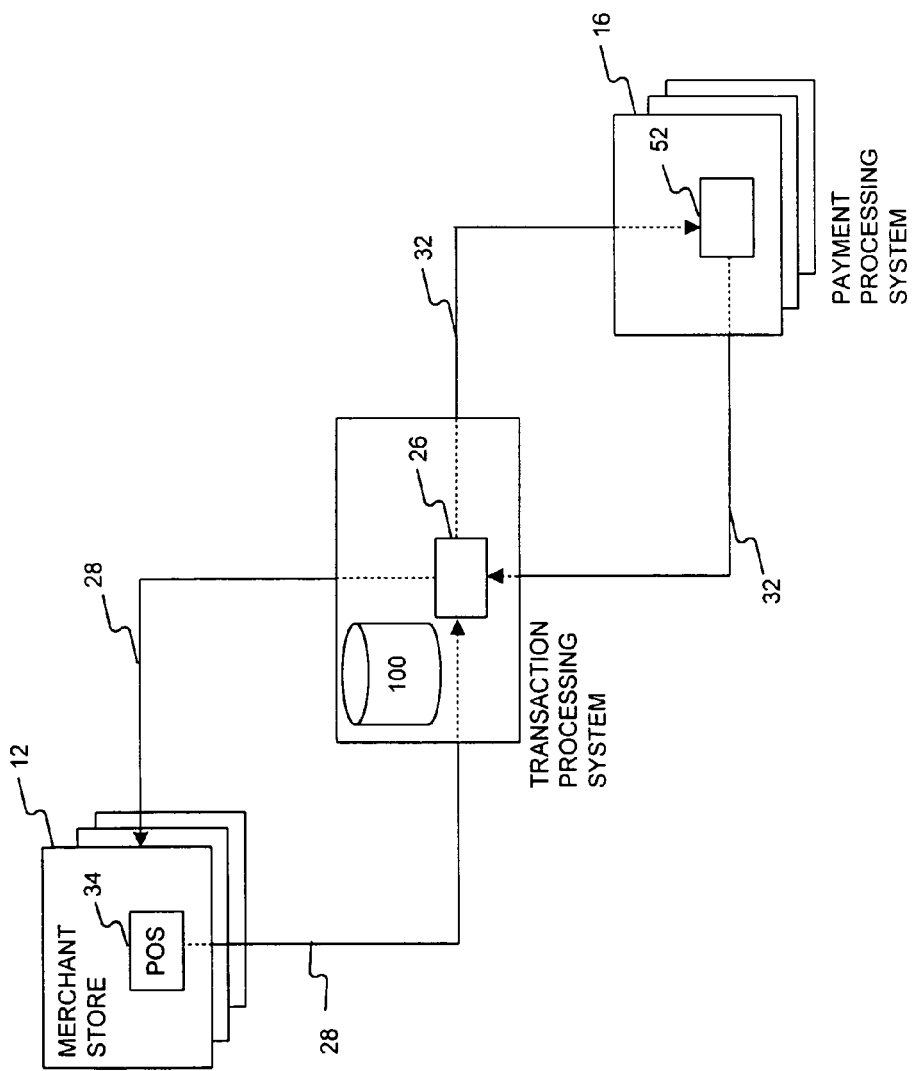
FIG. 3 is a diagram illustrating an improved system for processing transactions, consistent with the present invention.

FIG. 3 is a diagrammatic representation of a system 30 for processing retail non-cash transactions in accordance with a preferred embodiment of the present invention. In FIG. 3, system 30 is comprised of merchant store 12, payment processing system 16 and transaction processing system 26. Located in merchant store 12 is at least one POS device 34 for capturing transaction and customer identification data. Payment processing system 16 utilizes at least one payment processing terminal 52 to process purchase transactions. POS device 34 communicates with transaction processing system 26 over communications link 28 and payment processing terminal 52 communicates with transaction processing system 26 over communications link 32. While this specification describes a system wherein POS device 34 communicates directly with transaction processing system 26, it is understood that POS device 34 may actually communicate with one or more intermediate computers that then communicate with transaction processing system 26, without departing from the spirit and scope of this invention. Communication links 28 and 32 may be secure, dedicated communication links (like links 13 and 15 in FIG. 1) or publicly accessible and unsecured.

Figure 4:
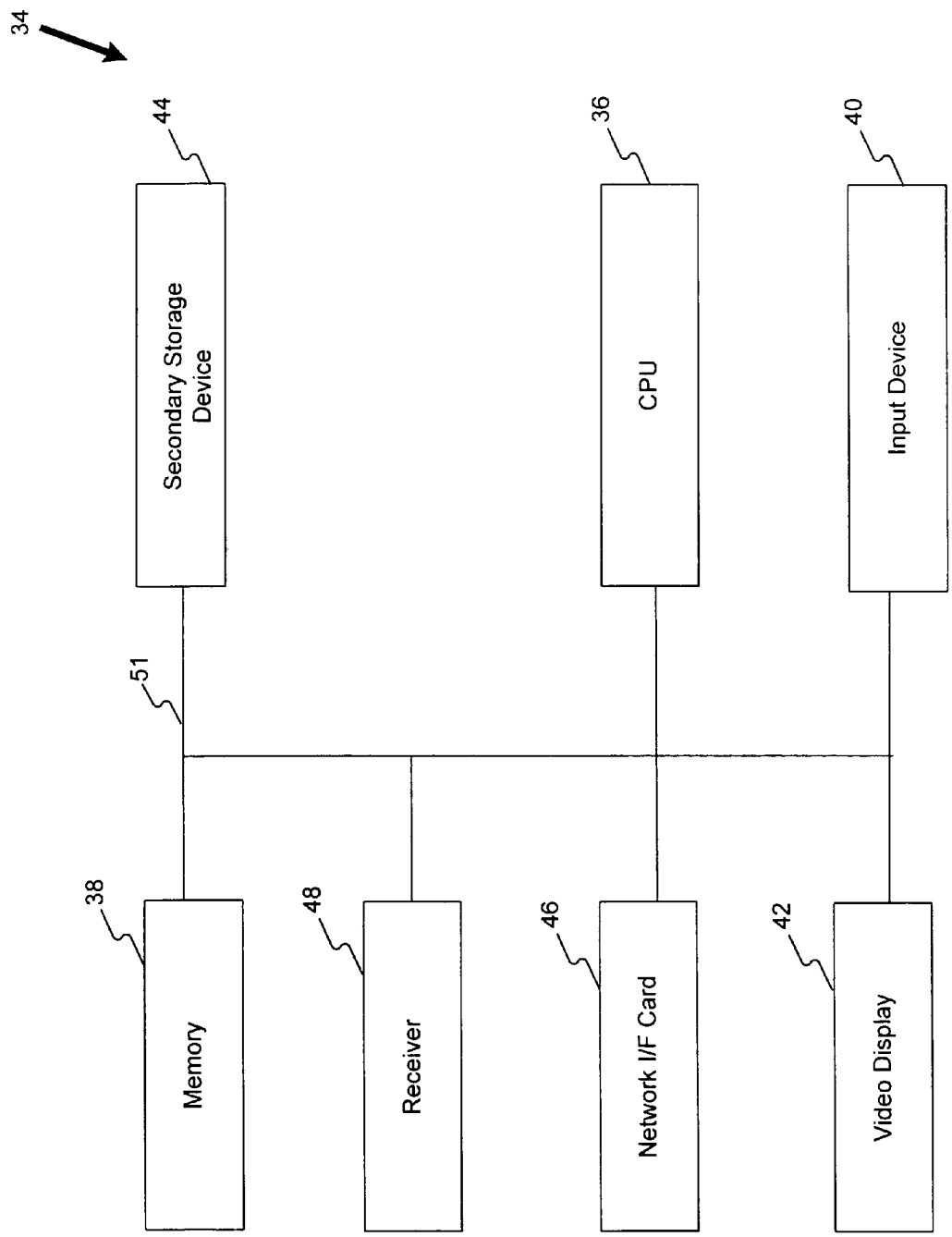
FIG. 4 is a diagrammatic representation of a point of sale device in accordance with the present invention.

A diagrammatic representation of POS device 34 is shown in FIG. 4. POS device 34 is any device used by merchants at the point of sale to record transactions between customers and merchants, including cash registers, point-of-sale terminals, etc. As shown, POS device 34 is comprised of a conventional microprocessor 36, a random access memory (RAM) 38, an input device (e.g., keyboard, scanner, etc.) 40, a display or screen device 42, a mass storage 44 (e.g., hard or fixed disk, removable floppy disk, optical disk, magneto-optical disk, or flash memory), a network interface card, modem or controller 46 (e.g., Ethernet), and a merchant transceiver 48. As shown, the various components of each POS device 34 communicate through a system bus 51 or similar architecture. POS device 34 communicates with other POS devices (not shown) and with transaction processing system 26 via network interface card or modem 46. Alternatively, the POS device 34 may be connected via an ISDN adapter and an ISDN line for communications with the transaction processing system 26. merchant transceiver 48 provides wireless communication with a customer transceiver 50 (explained below) which may be carried by a customer on, for example, his key chain. There may be other components as well, but these are not shown to facilitate description of the unique aspects of this embodiment of the invention. The hardware arrangement of this computer, as well as the other computers discussed in this specification is intentionally shown as general, and is meant to represent a broad variety of architectures, which depend on the particular computing device used. For example, mass storage devices depicted with each computer may be co-located with its associated computing device on an internal storage device or it may be remotely located on an external storage device.

Figure 5:
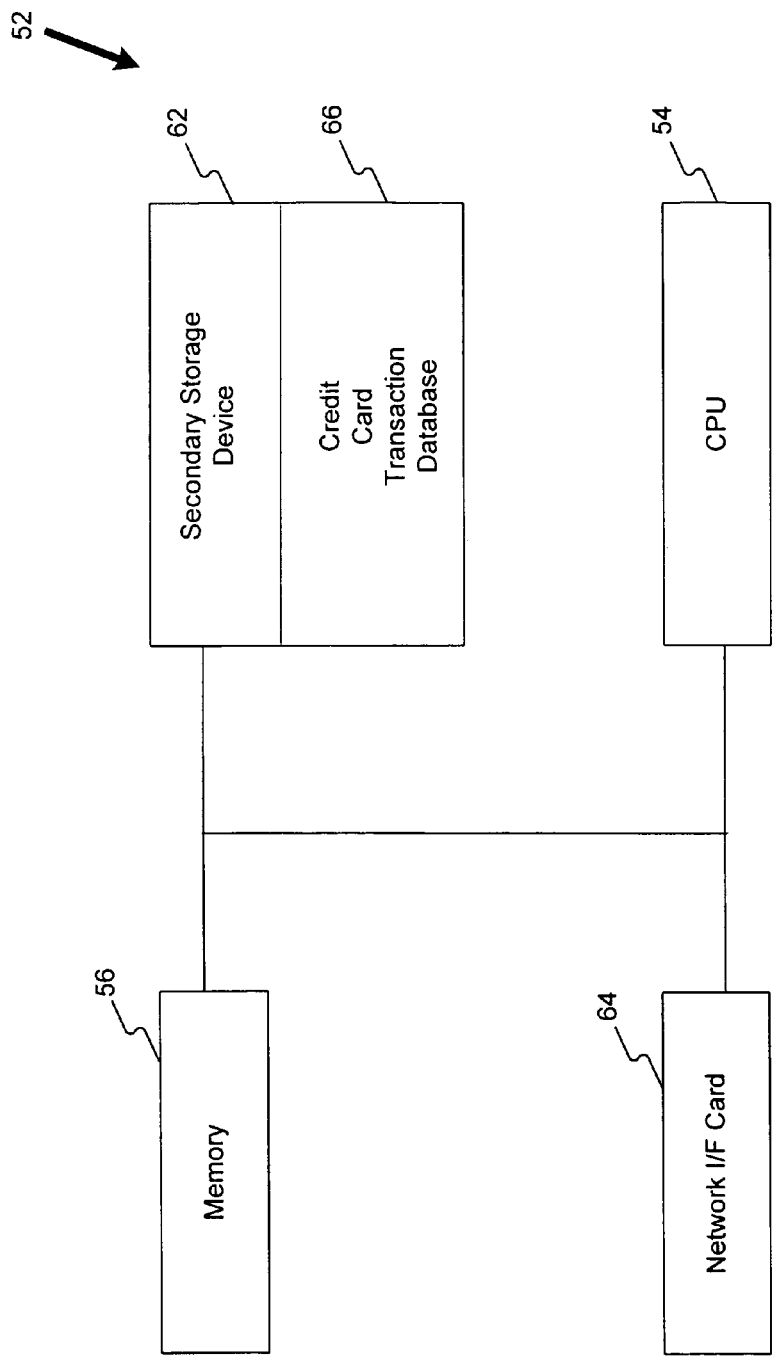
FIG. 5 is a diagrammatic representation of a payment processing terminal in accordance with the present invention.

A diagrammatic representation of payment processing terminal 52 is shown in FIG. 5. Like POS device 34, payment processing terminal 52 is comprised of a CPU 54, RAM 56, a mass storage device 62, and a network interface card or modem 64 for communicating with transaction processing system 26. Stored in mass storage device 62 is a payment database 66 for authorizing payment in response to consumer transactions.

Figure 6:
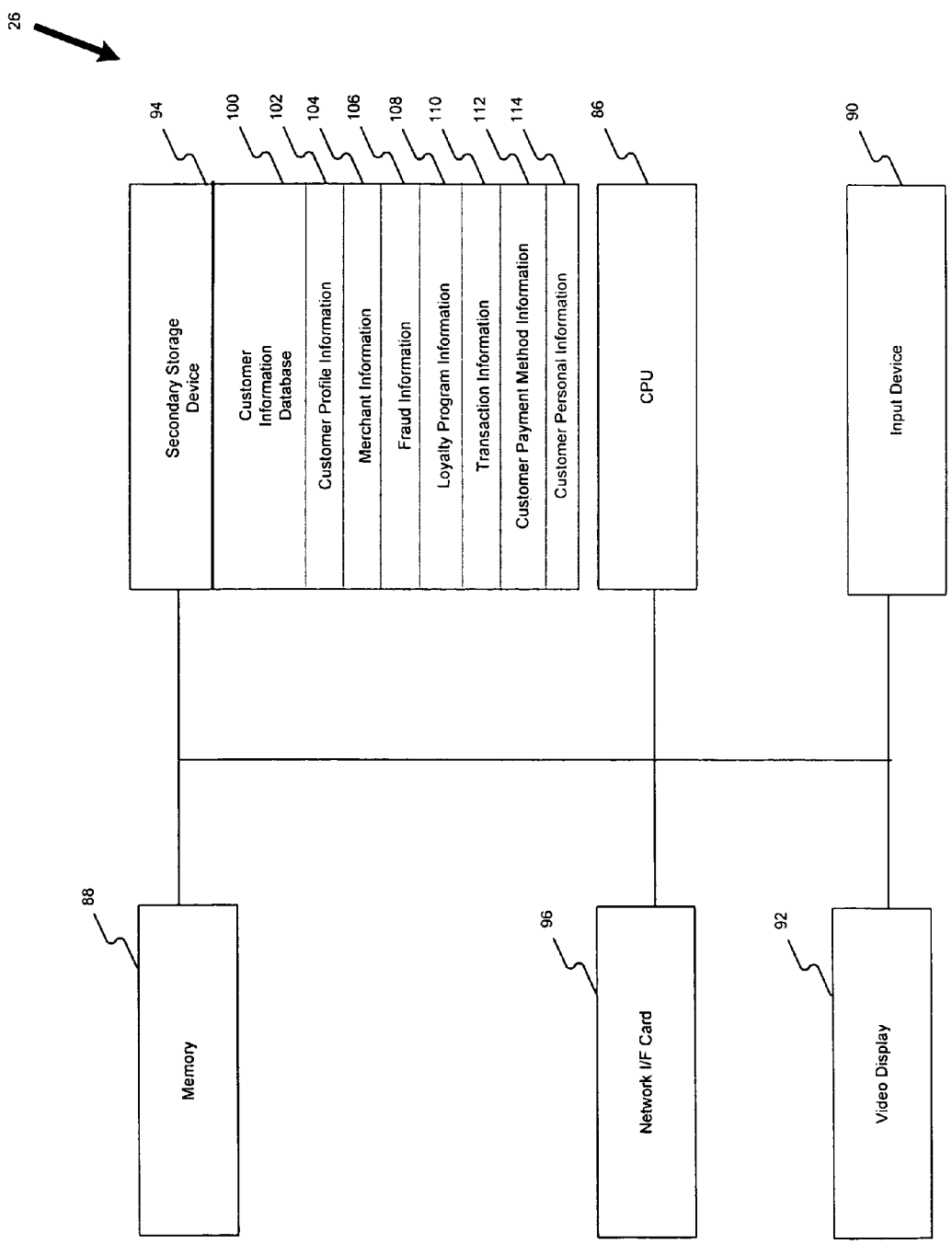
FIG. 6 is a diagrammatic representation of a transaction processing system in accordance with the present invention.

A detailed diagram of transaction processing system 26 is shown in FIG. 6. As shown in FIG. 6, transaction processing system 26 is comprised of a CPU 86, RAM 88, an input device 90, a display or screen device 92, a mass storage device 94, and a network interface card or modem 96 for communicating with POS device 34 and payment processing terminal 52. Stored in mass storage device 94 is a customer information database 100 for identifying a customer, payment method, payment processor, and authorization data format when given a customer/transmitter ID number. The organization of data inside customer information database 100 may take on a variety of physical structures, dependent upon evolving data management technology. Examples include, but are not limited to flat files, relational tables, star tables, hierarchical files, and objects. The data will be organized so that storage and retrieval of customer data facilitates effective navigation, association, and use of customer-related data for identification, transaction authorization, customer contact, identification of customer preferences and other uses of the data consistent with the spirit and scope of this invention. The database is structured to provide maximum security to protect the privacy of customer and merchant information. The ability to relate groups of data such as customer data with specific customer transaction data, for example, will be controlled via the structure of the data storage design as well as through controls of the database system to prevent unauthorized access of detailed and aggregated data by both internal and external sources.

As shown in FIG. 6, customer database 100 may be comprised of the following categories of information: customer profile information 102, merchant information 104, fraud information 106, loyalty program information 108, transaction information 110, customer payment method information 112, and customer personal information 114. Customer profile information 102 identifies and describes each customer. It includes, but is not limited to: customer address data, phone number, occupation, PIN, billing address, primary account holder name, authorized user name, customer transceiver activation status and customer transceiver identification number. Merchant information 104 identifies and describes each participating merchant. It includes, but is not limited to: merchant name, accepted payment methods with associated authorization procedures (if appropriate), merchant location and merchant identifier. It is important to note that some payment methods (e.g., check, credit and debit) require authorization procedures, while others (e.g., cash, certified check, etc.) do not. Fraud information 106 is used to ensure that customer transceivers 50 are not used by unauthorized users. This information includes, but is not limited to: transmission device identifier, activation status, merchant identifier, merchant location, date of sale, time of sale and sale amount. Loyalty program information 108 defines specific merchant loyalty programs. It includes, but is not limited to: program rules, specific points or other benefits for each merchant loyalty program component. Transaction information 110 includes a listing of the transactions previously conducted by a customer using transaction processing system 26. The information includes, but is not limited to: transaction type, item purchased, merchant, date purchased, dale amount, loyalty program usage. Customer payment method information 112 defines the payment method to be used by each customer at each merchant. Examples include, but is not limited to: default payment method, credit card number, debit card number, bank account number, associations between each merchant and each payment method. Customer personal information 114 comprises a plurality of individual customer purchasing preferences and other customer-unique personal information. For example, suppose the merchant is Burger King™. The purchasing preference could be the customer's favorite meal or menu item such that whenever the customer initiates a transaction with the merchant, the purchasing preference will automatically be ordered for the customer. Other examples include, but is not limited to: customer shoe size, suit size, spouse's birthday, spouse's suit size, etc. Additional information may be stored in customer transaction database 100, and the data may be organized in a different manner, without departing from the scope of the present invention.

Figure 7:
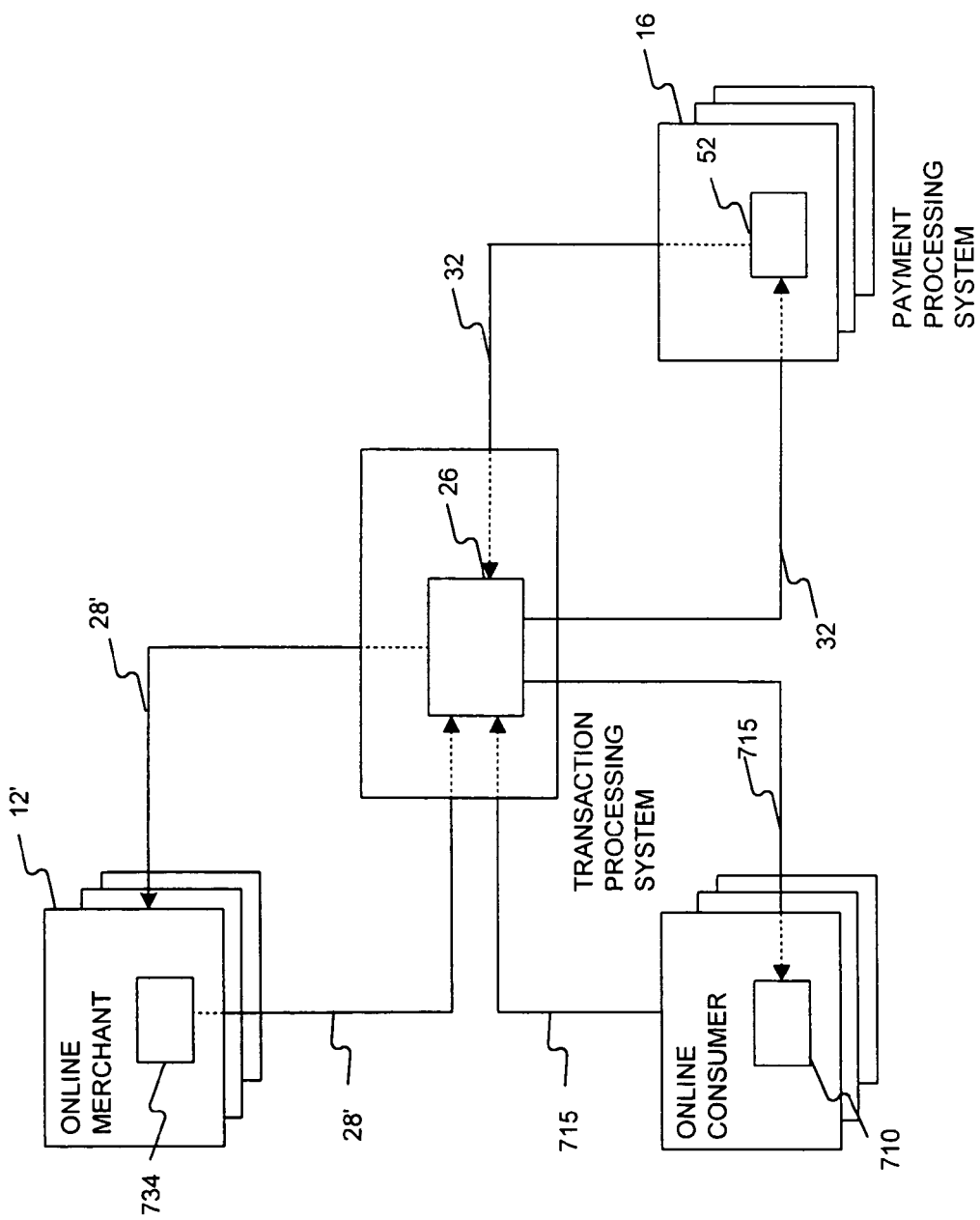
FIG. 7 is a diagrammatic representation of an alternate embodiment of a system for processing transactions in accordance with the present invention.

A second embodiment of the present invention is directed to a method and apparatus for securely processing financial transactions over the Internet or other unsecured network. FIG. 7 is a diagrammatic representation of a system 700 for processing retail, non-cash transactions in accordance with the second embodiment. In addition to the elements shown in FIG. 3, system 700 in FIG. 7 further comprises an online consumer terminal 710 that communicates with transaction processing system 26 over communications link 715. Online merchant 12' replaces merchant store 12, online merchant computer 734 replaces POS device 34, and communication link 28' replaces communication link 28 shown in FIG. 3. In this embodiment, communication links 28' and 715 are typically unsecured, publically accessible links. As in the case of the preferred embodiment, communication links 28', 32 and 715 may be any combination of publically accessible or secure dedicated links.

The difference between merchant store 12 (FIG. 3) and online merchant 12' is that merchant store 12 is a conventional "brick and mortar" store where consumers can physically select and purchase merchandise, whereas online merchant 12' is a WEB site operated by a merchant that allows online consumers to examine and purchase merchandise over a computer network. Online merchant computer 734 is preferably operated by retail establishments (Macy's, K-mart, Border's, etc.) Its main role is to collect merchandise orders from online consumer terminals 710, and arrange for delivery of the merchandise once it receives authorization from a payment processing system 16.

Figure 8:
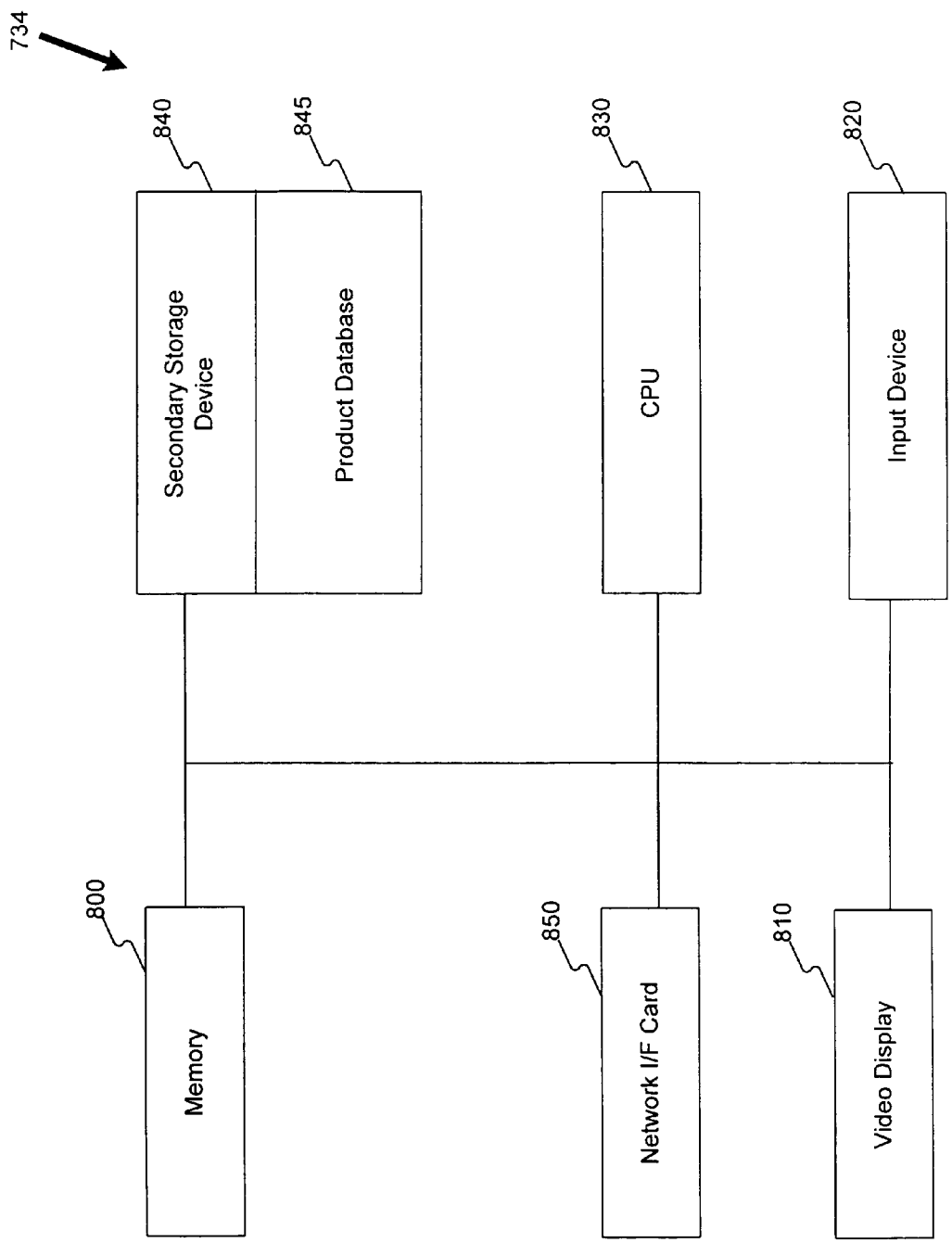
FIG. 8 is a diagrammatic representation of an online merchant computer in accordance with the present invention.

FIG. 8 is a diagrammatic representation of an online merchant computer 734 in accordance with the present invention. As shown in FIG. 8, online merchant computer 734 is comprised of a main memory 800, a display device 810, input device 820, a mass storage device 840, a CPU 830 and a network interface card or modem 850. As further shown in FIG. 8, the mass storage device 840 contains the merchant's product database 845. Product database 845 is comprised of information on various merchant products available online.

Once a user accesses a merchant's home page, he/she will be able to access all of the merchant's product pages that are associated with the home page. Individual pages may be sent in the form of Hyper-Text Markup Language (HTML) pages across communication link 715 to a WEB browser 960 operating on a requesting online consumer computer 710.

Figure 9:
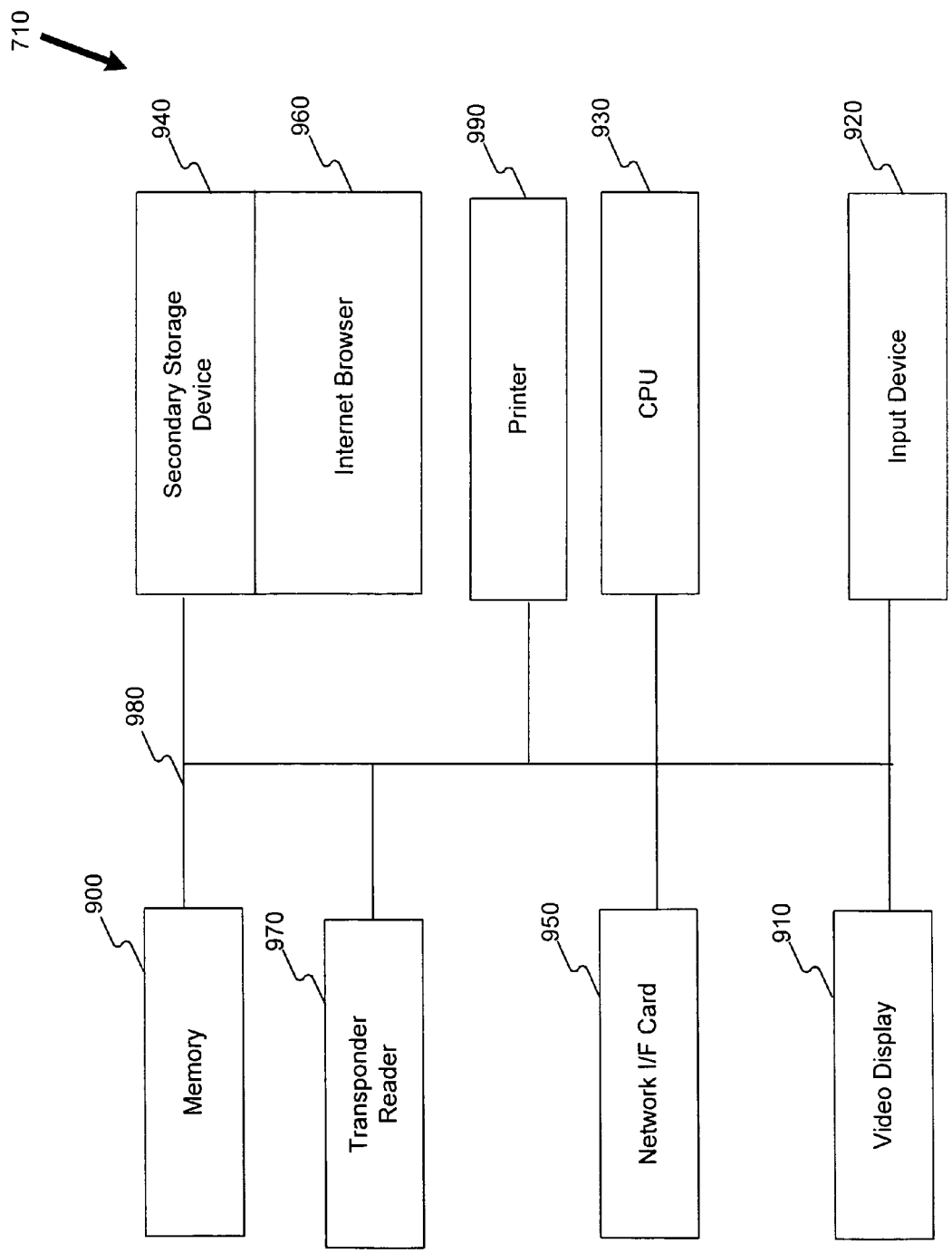
FIG. 9 is a diagrammatic representation of an online customer computer in accordance with the present invention.

As shown in FIG. 9, the online consumer computer 710 preferably includes a main memory 900, a display device 910, input device 920 such as a keyboard and a pointing device (e.g., mouse, track ball, pen, slide pointer or similar device), a mass storage device 940, a transceiver 970, a printer 990, and a CPU 930 for performing various functions related to retrieving and viewing WEB pages stored on the Internet. These components communicate through a system bus 980 or similar architecture. Additionally, the customer computer 710 is preferably connected to a network interface card or modem 950 for communication with the transaction processing system 26. The mass storage device 940 of the customer computer 710 maintains an Internet browser 960 for directing the CPU.

The second preferred embodiment processes transactions very similarly to the first embodiment. That is, an online consumer located at an online consumer computer 710 selects merchandise, identifies it to the online merchant computer 734 and inputs his or her customer/transmitter ID number using a customer transceiver 50 into transceiver 970. The information is transmitted from transceiver 970 via system bus 980 to CPU 930 where it is then transmitted to the online merchant computer 734. Upon receiving the data, the online merchant computer 734 creates an authorization request comprised of the customer ID, a merchant ID and transaction data, and then transmits the data to transaction processing system 26. Transaction processing system 26 then transmits the data to the appropriate payment processing system 16. As in the case of the preferred embodiment, payment processing system 16 authorizes the transaction and then transmits an authorization back to the online merchant computer 734 and online consumer computer 710 via the transaction processing system 26. Once the online merchant computer 734 receives the authorization, merchant's online sales associate prepares the merchandise identified by the customer, and then ships it to the address indicated in the customer information database 100 or any other location specified by the customer. The transaction processing system 26 is capable of managing customer loyalty and consumer trend analysis in the same manner as the first embodiment. In fact, since the transaction processing system 26 is capable of interacting with both in-store and on-line systems, it provides participating merchants the ability to comprehensively monitor customer loyalty and consumer purchasing trends for online consumers and in-store consumers using a single system.

A third embodiment of the present invention is directed to a method and apparatus for processing retail non-cash transactions at a kiosk or other similar self-service station. A terminal located at the kiosk is similar to online consumer computer 710 except that a product database similar to that found in online merchant computer 734 is stored in the mass storage device. In operation, the customer in merchant store 12 approaches a kiosk in the store, indicates a food, merchandise or service selection, and provides a customer/transmitter ID using input device 920, customer transceiver 50 or a combination of the two. In doing so, the customer has placed an order for the desired article of food, merchandise or service and simultaneously initiated payment processing. Once the transaction is authorized, a receipt is printed on printer 990 and the purchase is delivered to the customer, either at the kiosk or at another predetermined location. This embodiment provides a combination self-service, automatic payment processing system, with order preparation being the only delay.

In yet another embodiment, a customer may place an order by telephone prior to arriving at merchant store 12, by interfacing with an automated system using DTMF tones through the telephone. That is, when an automated operator at merchant store 12 answers the telephone call, the customer is prompted to enter the customer/transmitter ID number and his/her purchasing preference via the DTMF buttons. Upon arrival, the customer's food, merchandise or service is ready at a drive-through window or inside a special line within merchant store 12. Payment has, at this time, already been processed. The customer uses customer transceiver 50 to identify themselves prior to a sales associate providing the merchandise to the customer. In this example, customer transceiver 50 is simply used to identify that the customer receiving the food, merchandise or services is the customer who corresponds to the customer/transmitter ID previously communicated to the merchant through the DTMF system. Different transactions may be conducted and different information may be exchanged between the merchant and customer to confirm the customer's identification without departing from the scope of this invention. For example, a customer may conduct a transaction over the telephone using a payment method not recognized by the transaction processing system 26, and then take delivery of the merchandise/services after confirming his/her identification using customer transceiver 50 and paying for the items. Customer transceiver 50 may also be used to confirm an individual's identification even in the absence of an underlying transaction. For example, a transceiver 48 may be located adjacent to an airplane loading gate or other restricted access point. A customer seeking to gain access to the restricted area simply provides his identification by interfacing customer transceiver 50 with merchant transceiver 48. This action initiates the security process which may also require an additional form of identification (e.g., picture ID, boarding pass, etc.) to complete. Once the process is completed, the customer is permitted to cross the boundary. Another embodiment of customer transceiver 50 includes a customer transceiver that identifies a class of persons (e.g., handicapped) such that when a person interfaces with the transaction processing system 26, an attendant will be alerted as to any special customer needs. Yet another embodiment includes a customer transceiver 50 that identifies an individual to a service provider, permitting the service provider to then access information about the customer for the purpose of providing personal services to the customer. A further embodiment includes a customer transceiver 50 that transmits automatic teller machine (ATM) card information to an ATM. Once the ATM receives the information, the customer is prompted to input his/her PIN and transaction information, allowing the process to continue as usual.

Figure 10:
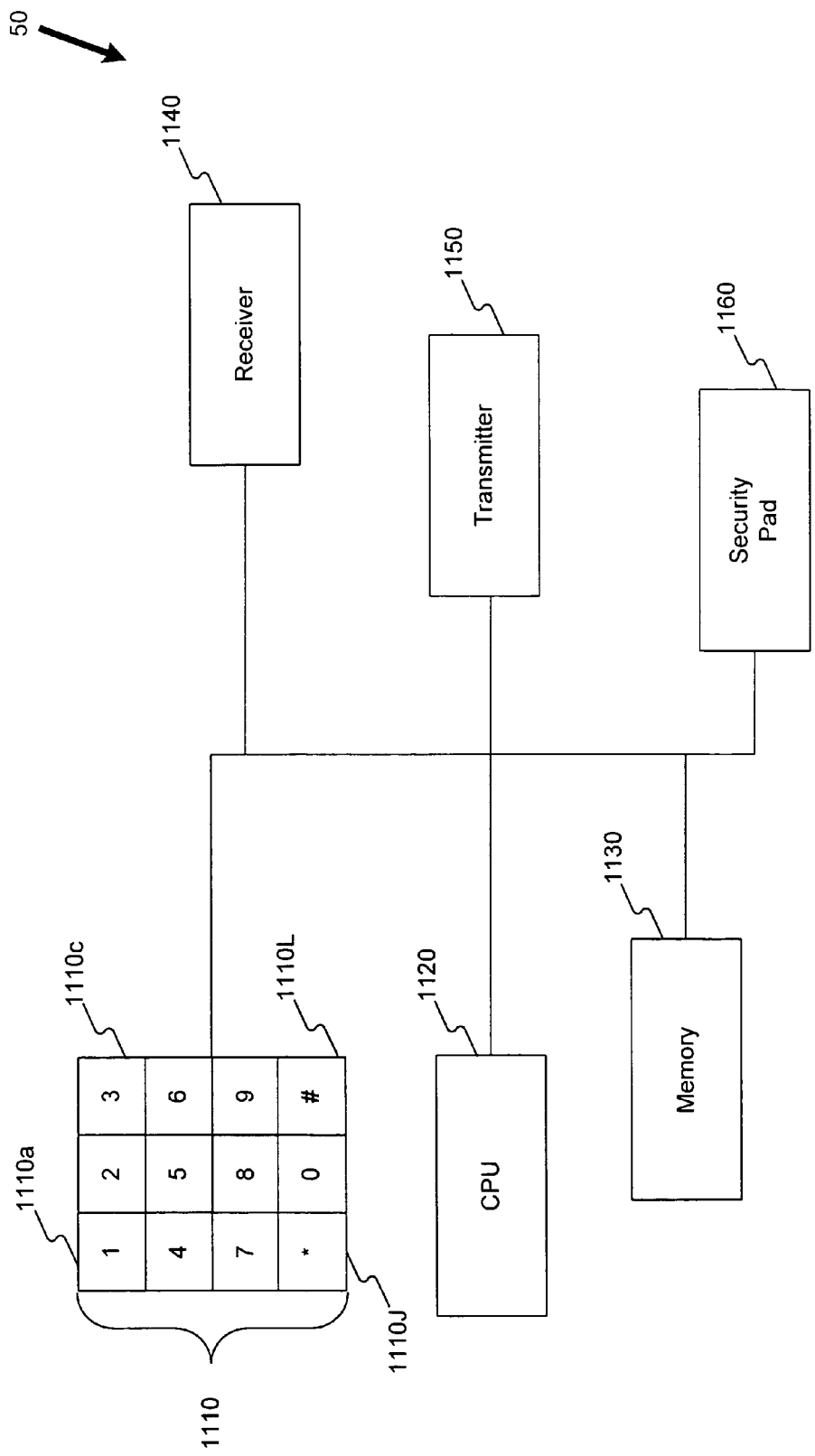
FIG. 10 is a diagrammatic representation of a customer transceiver in accordance with the present invention.

Various active and customer transceivers (48 and 50, respectively) may be implemented in the course of practicing this invention. For example, the TIRIS system commercially available from Texas Instruments Corporation is representative of the technology. Further details of digital signature transponder (DST) and TIRIS technology are contained in U.S. Pat. No. 5,541,604 assigned to Texas Instruments Deutsche Line GmBh, the disclosure of which is hereby expressly incorporated by reference. A simplified diagram of a preferred embodiment of customer transceiver 50 is shown in FIG. 10. As shown, customer transceiver 50 is comprised of a keyboard 1110, CPU 1120, memory 1130, receiver 1140, transmitter 1150 and security pad 1160. As further shown in FIG. 10, keyboard 1110 is comprised of a plurality of buttons 1110a-1110l, labeled 0-9, "*" and "#". Each button may correspond to its labeled number/character, or to a selectable user option. For example, button 1110a may correspond to the number "1" such that when a user presses it, the number "1" is communicated to CPU 1120. Button 1110a may alternatively correspond to a user-specified item (e.g., primary credit card, a secondary credit card, or a debit/bank account). In a preferred embodiment, customer transceiver 50 has no independent battery or other power source, such that operational energy is received from transceiver (48 or 970), indicated generally in FIGS. 4 and 11, respectively. Customer transceiver 50 stores identification information such as a customer ID, or customer/transmitter ID in programmable, read-only memory (PROM) device 1130 for subsequent, repeated transmission to a transceiver (48 or 970). Memory device 1130 could optionally be an erasable PROM (EPROM) or random access memory (RAM) device, thereby allowing ease in modifying the contents of the memory device. As previously stated, one important characteristic of the preferred embodiment of customer transceiver 50 and merchant transceiver 48 is that operational energy for customer transceiver 50 is transmitted from the transceiver (48 or 970). When customer transceiver 50 is brought within close proximity to transceiver (48 or 970), a signal of a desired frequency passes through receiver 1140, causing it to generate a supply voltage for powering the other components of customer transceiver 50. The signal is received by CPU 1120 which then sends a signal to memory device 1130 and then to customer transceiver 1150 for transmission to an adjacent merchant transceiver 48.

Figure 11A:
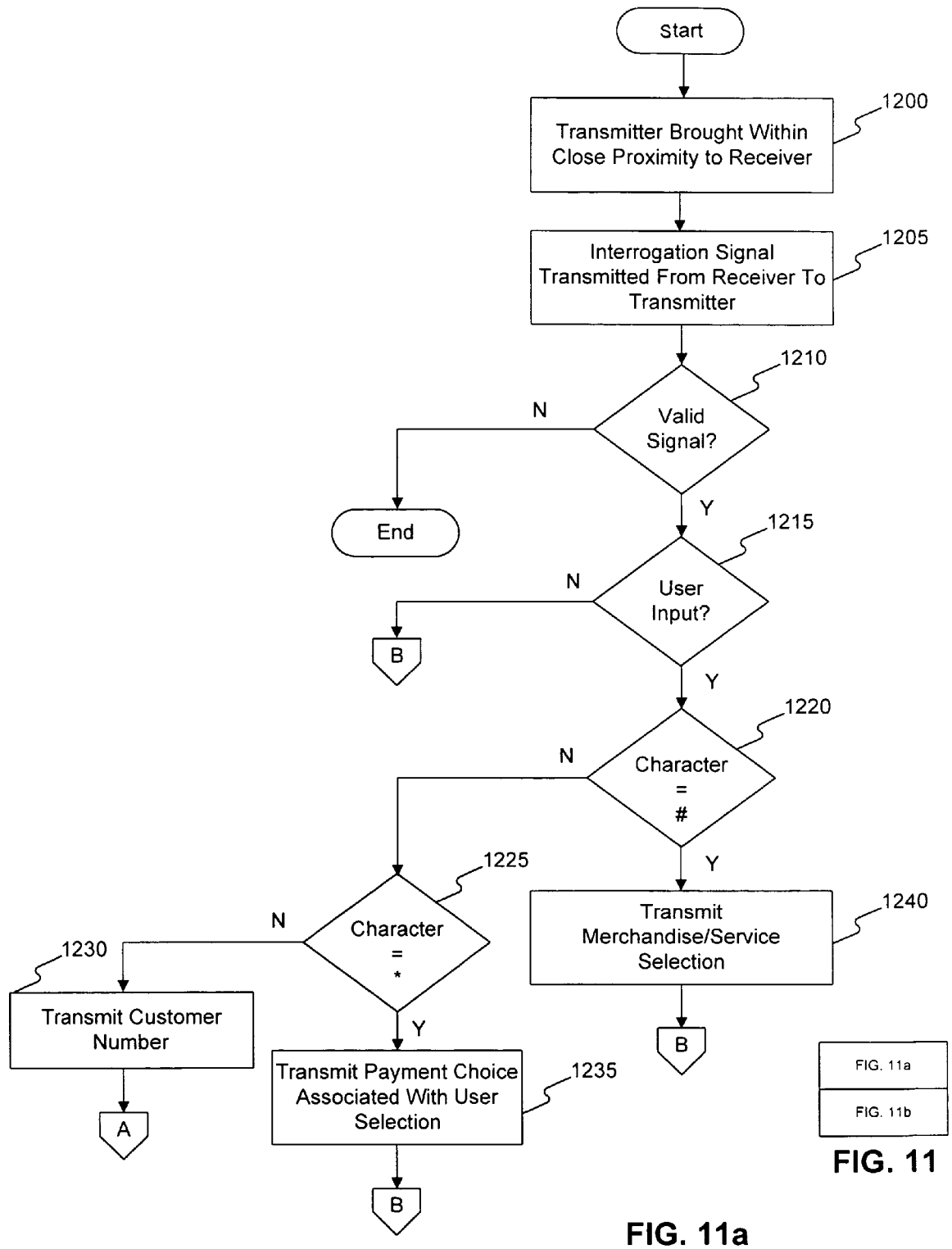
FIG. 11 is a detailed flow diagram depicting the steps performed by the preferred embodiment of a customer transceiver when brought in proximity of a merchant transceiver.
Figure 11B:
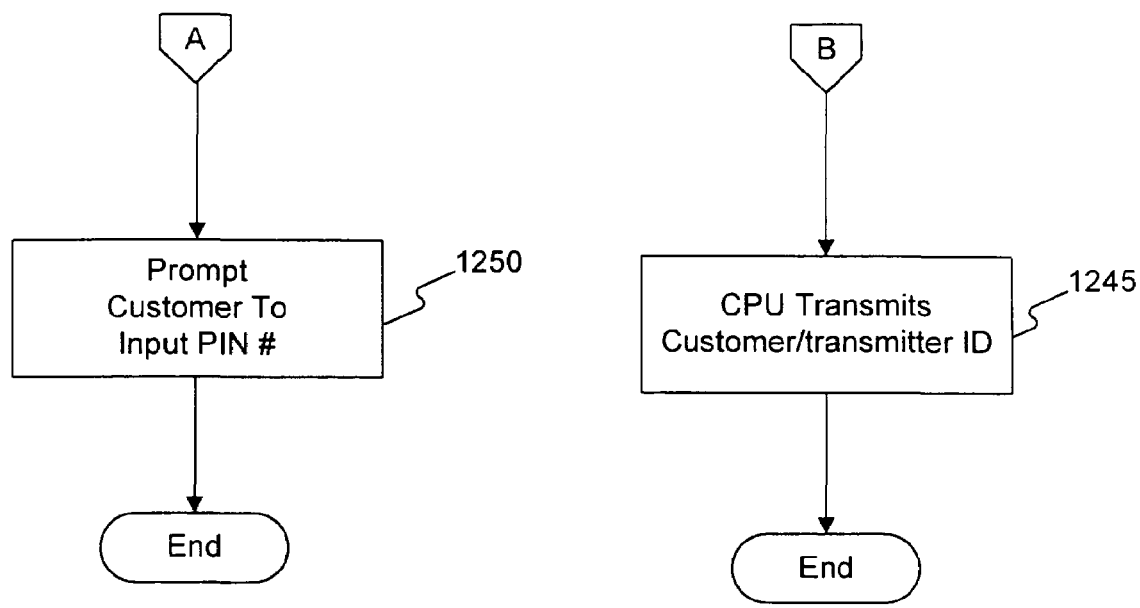

FIG. 11 is a detailed flow diagram depicting the operation of customer transceiver 50. The process begins at step 1200 when the user brings customer transceiver 50 within close proximity to a transceiver (48 or 970). In step 1205, an interrogation signal is transmitted from reader to customer transceiver 50. CPU 1120 processes the interrogation signal with an algorithm which is fixedly programmed into memory 1130 (step 1210). If the signal is valid, processing flows to step 1215, otherwise processing terminates. In step 1215, the CPU waits for user input via keyboard 1110. If the CPU does not receive input, processing flows to step 1245, otherwise processing flows to step 1220, where the CPU determines whether the first character entered is a "#", corresponding to button 1110l. If the first character is a "#", the CPU transmits a purchasing preference associated with the entered number (step 1240). As previously stated, customer database 100 is capable of storing a plurality of customer purchasing preferences, corresponding to specific items offered by merchant. Pressing "#" prior to pressing a numbered key specifies which order item the customer is interested in selecting. For example, "#1" corresponds to the first purchasing preference, pressing "#2" corresponds to the second, and so on. Processing then flows to step 1245. If the first character is not a "#", the CPU determines whether the first character is a "*", corresponding to button 1110j (step 1225). If the first character is a "*", the CPU 1120 transmits a payment choice selection associated with the entered number (step 1235). The customer must have a valid payment method associated with the entered number, and it must be accepted by the merchant. Otherwise, the process will terminate without authorizing the transaction. After the customer information has been entered, processing flows to step 1245 where the CPU 1120 next transmits the stored customer/transmitter ID. If the first character is not a "*", processing flows to step 1230 where the CPU 1120 simply transmits the entered numbers as a customer ID number. That is, the user may actually override the pre-programmed customer ID number and manually input a customer ID number. Processing then flows to step 1250 where the user is prompted to enter a PIN after which processing terminates. When the user manually enters a customer ID number, the system may also require additional authorizing information like a photo ID and/or a signature, to further ensure that customer transceiver 50 is not used in a fraudulent manner. While this specification describes operation of customer transceiver 50 as including the capability to specify a merchandise/service selection an alternate method of payment, a customer number or a PIN, it is obvious that any data or combination of data may be transmitted by customer transceiver 50 without departing from the spirit and scope of this disclosure.

As shown in FIG. 10, customer transceiver 50 may optionally include a security pad 1160 comprising a fingerprint reader or other biometric recording device. In operation, when customer transceiver 50 is issued to the customer and prior to its first use, the customer inputs a biometric (fingerprint, palm print, pore print, retinal configuration, etc.) into security pad 1160. For the purposes of this discussion, it is assumed that the biometric is a fingerprint. The first time that customer transceiver 50 is used, the customer fingerprint is read and stored in memory 1130 of customer transceiver 50. When customer transceiver 50 is used for subsequent transactions, it will only activate if the same finger is placed upon security pad 1160, creating a match with fingerprint information stored at the first use of customer transceiver 50. Of course, any finger may be used at initial usage, however, the same finger must then consistently be used on all subsequent transactions. As an alternative, a predetermined number of separate fingerprints may be stored in customer transceiver 50, permitting its use by friends or family members. Initial fingerprints will be read, for example, by depressing one of four predetermined buttons prior to first use of customer transceiver 50. A series of fingerprints is then placed upon the security pad 1160 for storage within memory 1130 of customer transceiver 50. Customer transceiver 50 would then permit subsequent purchases to be made when a fingerprint on pad 82 matches any of the fingerprints prestored within customer transceiver 50. Fingerprint reading, storing, and matching technology is currently available from the plurality of sources including, for example, Indicator Technology Corporation, Biometric Identification Inc., and AuthenTec. Even though this specification describes the use of a fingerprint reader, other biometric identification options such as palm prints, pore prints, retinal configurations, etc. may, of course, also be implemented using customer transceiver 50. It should be understood that while this specification describes a security pad associated with customer transceiver 50, the security pad may actually be included in a computer display touch screen.

Another embodiment of customer transceiver 50 includes a customer transceiver with read/write capability. That is, when customer transceiver 50 is used to authorize a transaction, information is passed into memory 1130 from the merchant transceiver 48. For example, a predetermined quantity of money may be stored in memory 1130 such that whenever a transaction is carried out, the amount of the transaction is deducted from the total stored in memory 1130. When the total is exhausted, customer transceiver 50 will not activate until an amount is restored to memory 1130. Customer transceiver 50 may also track the customer's participation in loyalty programs by updating memory 1130 with purchase data whenever a transaction is authorized. Customer transceiver 50 may additionally support remote reprogramming of memory 1130. In other words, a customer wishing to change the customer/transmitter ID associated with customer transceiver 50 may do so by interfacing customer transceiver 50 with merchant transceiver 48 and then modifying the customer/transmitter ID by entering a special code sequence using keyboard 1110, for example. It is envisioned that whenever an customer/transmitter ID is updated by a customer, transaction processing system 26 will disable the subject customer transceiver, pending confirmation of the change. Customer transceiver 50 may alternatively accept customer/transmitter ID updates from transaction processing system 26 via merchant transceiver 48 without user input.

Although the described embodiments employ a customer transceiver carried as a separate item by the customer, customer transceiver 50 may be integrated into another device. For example, customer transceiver 50 may be embedded in a cellular phone, pager, remote control, car lock device, personal digital assistant, watch, or other miniature electronic device.

While the preferred embodiment of customer transceiver 50 envisions a device that receives operational energy from a merchant transceiver 48 prior to transmitting an RF signal, it is understood that any device capable of transmitting a signal across a wireless medium (e.g., cellular, microwave, etc.) may be utilized without departing from the scope of this disclosure.

Figure 12:
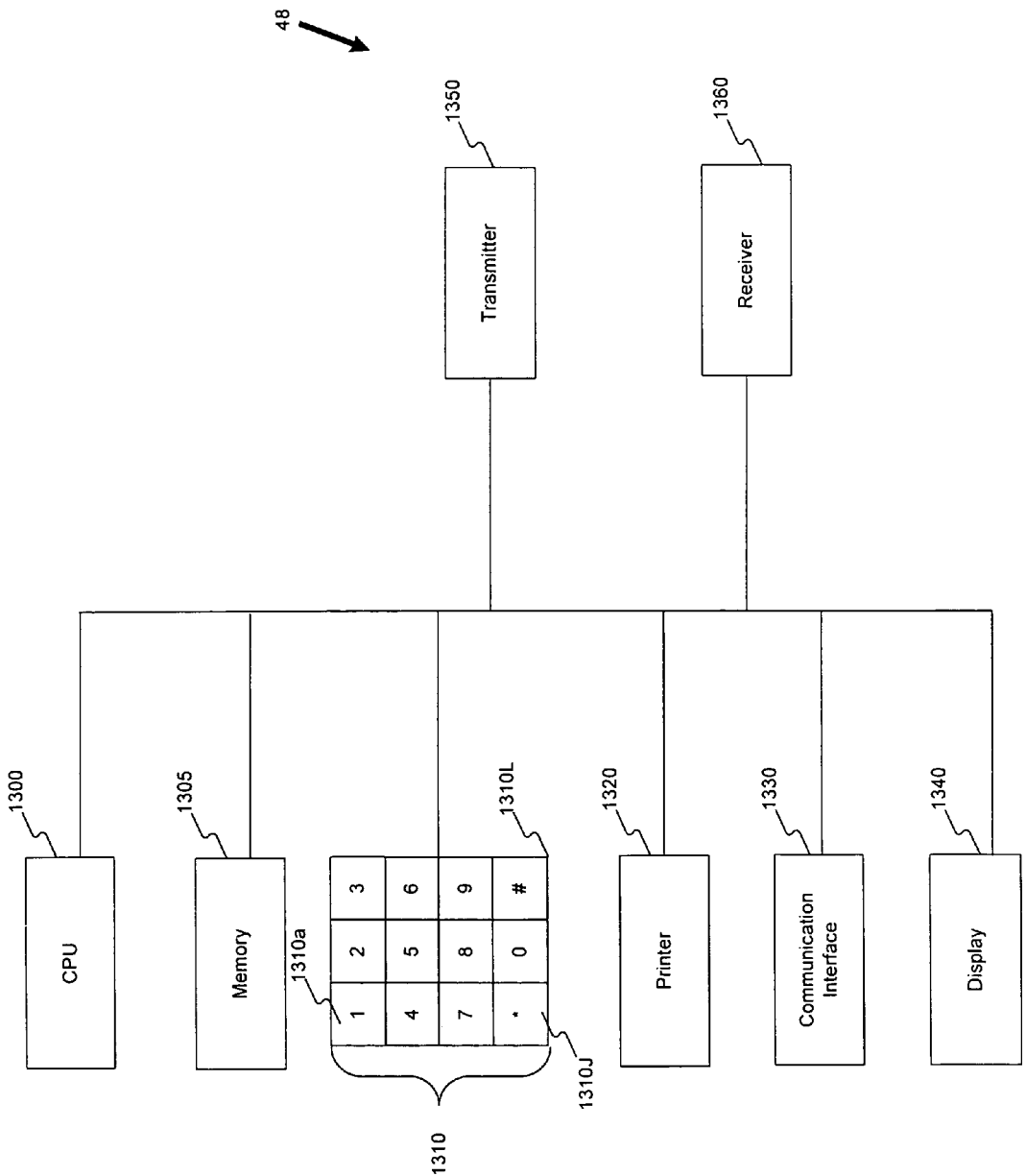
FIG. 12 is a diagrammatic representation of a merchant transceiver in accordance with the present invention.
Figure 14:
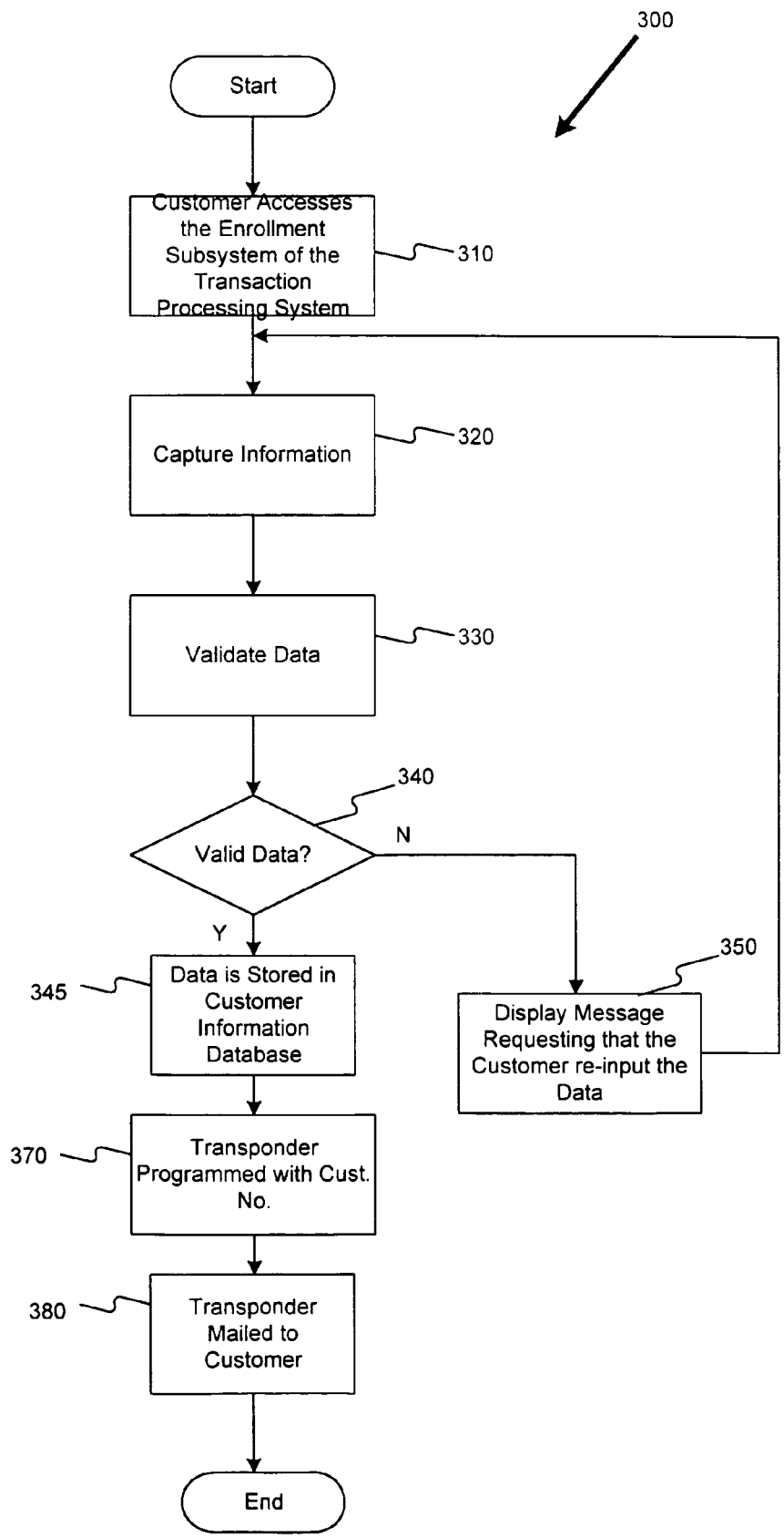
FIG. 14 is a detailed flow diagram depicting the steps performed to enroll a customer in accordance with the present invention.

FIG. 12 shows a detailed diagram of merchant transceiver 48 as previously discussed with reference to FIGS. 4 and 10. As shown in FIG. 12, merchant transceiver 48 is comprised of a CPU 1300, memory 1305, keyboard 1310, printer 1320, communication interface 1330, display 1340, transmitter 1350, and receiver 1360. Keyboard 1310, as further shown in FIG. 14, is comprised of a plurality of buttons 1310*a*-13101, labeled 0-9, "*", and "#". Keyboard 1310 may be utilized for receiving manually entered data (e.g., PIN) and transmitting the data to communication interface 1330. In operation, transmitter 1350 transmits an interrogation signal stored in memory 1305 to customer transceiver 50, causing the customer transceiver to generate a sufficient supply voltage for powering the customer transceiver. Receiver 1360 receives a signal from customer transceiver 50 and then transmits the signal to communication interface 1330 for subsequent transmission to an associated POS device 34, online customer computer 710, kiosk, etc. Communication interface 1330 may comprise a wireless or wireline interface, permitting merchant transceiver 48 to communicate with external devices from widely separated locations for the purpose of transmitting information received from a customer transceiver 50 via receiver 1360. Communication interface 1330 further permits merchant transceiver 48 to interface over the Public Switched Telephone Network (PSTN) via an RS232 connection to an internal modem (not shown). Customer transceiver 50 consequently may be capable of interfacing with a central location (over CATV coaxial cable) such that a person wishing to watch a Pay-Per-View™ movie can communicate with the pay per view system and purchase the movie directly through the television. Printer 1320 may be used to print a receipt for a customer upon completion of a transaction, and display 1340 may be used to communicate information to a customer (e.g., when to input his/her PIN.)

An alternate embodiment merchant transceiver includes a merchant transceiver built into or attachable to a portable device (e.g., Palm Pilot™, hand-held computer, etc.) that enables the capture and transmission of a customer ID and other security information for authenticating payment for goods and services via the Internet, or authenticating and authorizing access to digital information (e.g., movies, music, online books, research) and applications (e.g., voice/mail, personal calendar, "sports entertainment package," golf handicapping program). A further embodiment includes a portable merchant transceiver that allows a vendor (pizza delivery person) to authorize transactions from any location. The merchant transceiver includes a CPU 1300 with sufficient memory 1305 to capture and locally process a transaction. The merchant transceiver may or may not have wireless connectivity to the transaction processing system 26. Yet a further embodiment includes a merchant transceiver associated with a vending machine (snacks, cigarettes, stamps, etc.), pay phone, etc. for authorizing consumer transactions.

As discussed above, the preferred embodiment of the merchant transceiver 48 transmits power to, and receives an RF signal from a co-located customer transceiver. However, any device capable of receiving a wireless signal (cellular, microwave, etc.) is capable of functioning in the place of the merchant transceiver without departing from the scope of this invention.

In a preferred embodiment, transaction processing system 26 is owned and operated by a company separate from the entities that own merchant store 12 and payment processing system 16. In exchange for the service provided by transaction processing system 26, merchants are charged fees to process transceiver-based transactions. First, a transaction fee is charged for each transaction processed through transaction processing system 26. In addition, an advertising fee may be charged to cover brand communication. That is, customer transceiver 50 is supplied under a brand name owned by the owner of transaction processing system 26. This brand name is widely advertised to entice customers to patronize merchant stores 12 having the ability to conduct transactions using customer transceiver 50. Thus, the owner of transaction processing system 26 charges an advertising fee to participating merchant stores 12.

Alternatively, the transaction processing system 26 may permit large corporations owning multiple retail outlets to market customer transceiver 50 using their brand name. Thus, such merchant companies will "issue" customer transceivers 50 and pay a fee to the transaction processing system. The transaction processing system then offsets these costs to merchant stores 12 by providing monthly rebates based on the dollar volume of transceiver-based transactions conducted through its outlets.

The Preferred Method for Processing a Financial Transaction

The preferred method for processing a financial transaction will now be described in conjunction with FIGS. 13-17. As described above, the system 10 is operative for capturing a customer's transmitter ID at a POS device 34, combining the captured data with the merchant ID and the customer's selected purchase items into an authorization request, encrypting at least a portion of the request (if desired), and transmitting it to transaction processing system 26. Once it receives the authorization request, the transaction processing system 26 identifies the appropriate payment processing system 16 and then transmits the customer's payment data and the transaction data to the payment processing system 16 for authorization. After the payment processing system 16 authorizes the transaction, it transmits an authorization code back to the merchant via the transaction processing system 26. The transaction processing system 26 may also transmit customer identification and purchase data upon request by a participating merchant. In addition to its function of authorizing retail transactions, transaction processing system 26 also collects the transaction data for later use in compiling consumer purchasing trend data and tracking a consumer's progress in a merchant's loyalty program.

Figure 13:
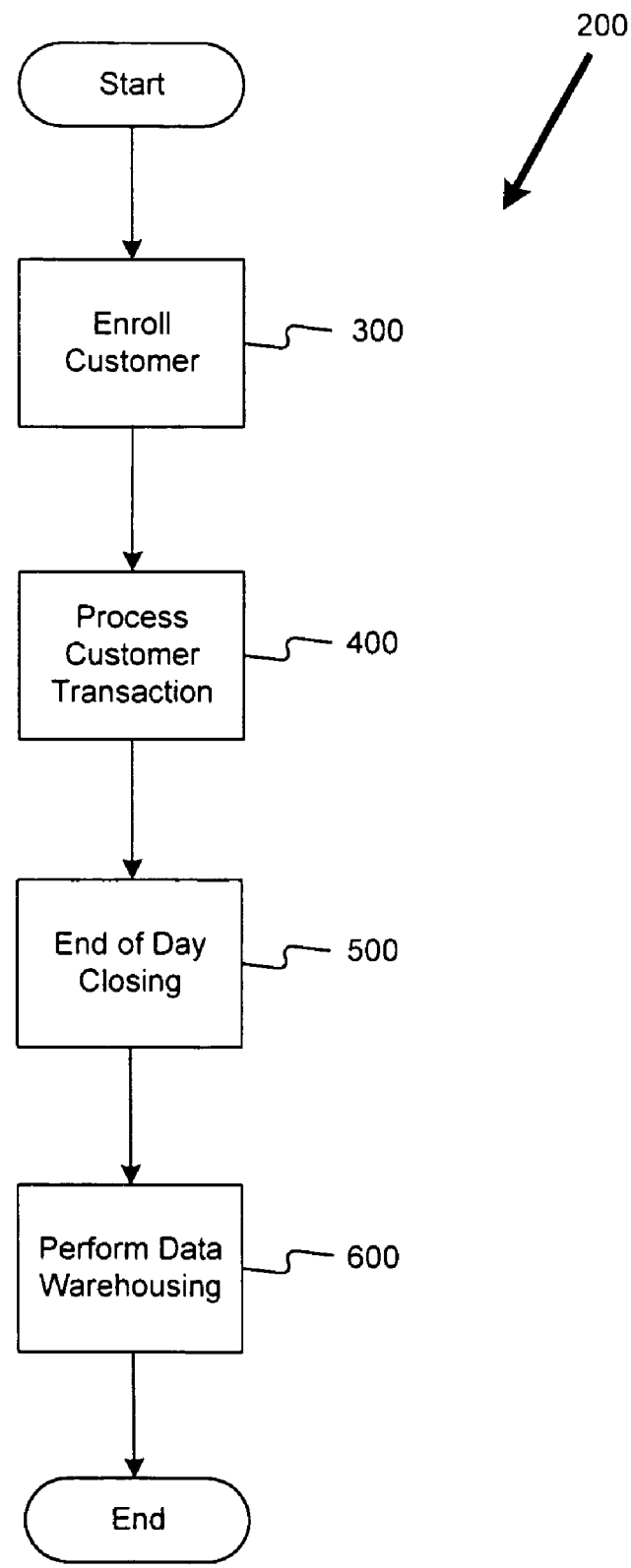
FIG. 13 is a flow diagram illustrating the preferred method for processing financial transactions in accordance with the present invention.

FIG. 13 is a flow diagram illustrating the preferred method 200 for processing financial transactions. The steps that comprise the method described in 200 are carried out by the various equipment that form a part of system 10 for processing financial transactions. The method begins at step 300 with the customer accessing the enrollment subsystem of the transaction processing system 26. This step includes all the activities that must take place before an individual can consummate retail transactions with customer transceiver 50 using transaction processing system 26. After the customer is enrolled, processing flows to step 400 and the system then is capable of processing a customer transaction. At a predetermined time interval, preferably every 24 hours, processing then flows to step 500 where system 10 updates customer preferences and profiles and settles charges for the time period. Next processing flows to step 600 at which time system 10 performs the processing necessary to archive captured data and update loyalty program data.

FIG. 14 is a detailed flow diagram depicting the steps performed by system 10 in step 300 of FIG. 13. As shown in FIG. 14, the process begins in step 310 when a customer accesses the enrollment subsystem of the transaction processing system 26 for the purpose of opening an account. The act of accessing the enrollment subsystem of transaction processing system 26 can be performed any number of ways from simply telephoning a human customer assistance representative and verbally communicating the information over the telephone, to dialing a telephone number and interfacing with a computer using dial tone multi frequency (DTMF) tones, to logging onto the Internet and accessing a predetermined uniform resource locator (URL). Once the customer is logged onto the system, processing flows to step 320 and the enrollment subsystem of transaction processing system 26 prompts the user to enter customer information. During this process, the customer provides customer profile information 102, customer payment method information 112, and customer personal information 114. These data are used for communicating with the customer and may be combined with other data (e.g., transaction information 110, customer personal information 114, etc.) to provide special promotions of particular interest to the customer. During enrollment, the customer also provides the payment methods to be invoked by the transaction processing system 26, whenever he/she initiates a transaction. For example, a customer will provide credit, debit, and other payment-related data so that the customer may be properly charged for purchases. When the customer enters data in the customer transaction database 100, he/she may select any one of the merchant's accepted payment methods in which he/she also has accounts. That is, the customer may choose to have all of his transactions conducted in merchant #1's retail establishments allocated to his VISA™ card even though he has several other cards that are also accepted by merchant #1. Alternatively, the customer may specify that his transceiver-based transactions will be processed and paid through his bank credit or debit card. Furthermore, the customer may specify that all transactions at merchant #1 will be cash transactions, despite the fact that the customer also has credit accounts accepted by merchant #1. The number of merchants associated with each customer record in customer transaction database 100 depends on the number of merchants entered into the system by a particular customer. In other words, customer #1 may have two merchant entries, corresponding to the number of merchants that the customer frequents, whereas customer #2, who is less debt averse may have 20 merchant entries. It is important to realize that certain information must be entered in order for the system to operate properly (e.g., name, address, PIN #, etc.), and other information can be entered at the discretion of the customer (e.g., marital status, birth date, etc.) When enrolling, the customer is informed that not only is the input of certain information discretionary, but that they can restrict the publication and use of the information by the transaction processing system 26.

Customers may also identify a default payment method to be applied to a participating merchant for which no other payment method has been identified. This default payment method would also be applied to new merchants that join the transaction processing system 26 after the customer enrolled. Part of the enrollment process includes the customer providing customer personal information such as preferred product brands at different merchants, anniversary and other important dates, clothing sizes, etc. As explained below, all of the data provided by the customer during the enrollment process can be later changed at the customer's discretion. A customer can request more than one customer transceiver 50 to be associated with each account as well as identify other authorized users for each customer transceiver. The rules for use of multiple customer transceivers 50 by multiple individuals are controlled based on the rules of the payment processor 16.

Once the customer has entered the requested information, system 26 validates the payment methods selected by the customer for legitimacy and acceptance. This process is carried out by comparing user-inputted information with data stored in payment processing terminal 52. Once the data is determined to be valid, processing flows to step 345 and the data is stored in customer information database 100. A customer transceiver 50 is programmed with the customer's ID number in step 370, the customer transceiver 50 is mailed to the customer in step 380. Before the customer can use customer transceiver 50 to authorize a transaction, customer transceiver 50 must be activated by the customer. This security process helps ensure legitimate use of the customer transceiver 50 by authorized personnel. In a preferred embodiment, customers activate customer transceiver 50 using identification information provided by them during enrollment and information provided to them in the device package. Once customer transceiver 50 is activated, it can be used by a customer to activate a transaction. If the data is invalid, the system prompts the user to correct the invalid information and processing is routed back to step 320 where the customer is prompted to re-input the invalid information.

Figure 15B:
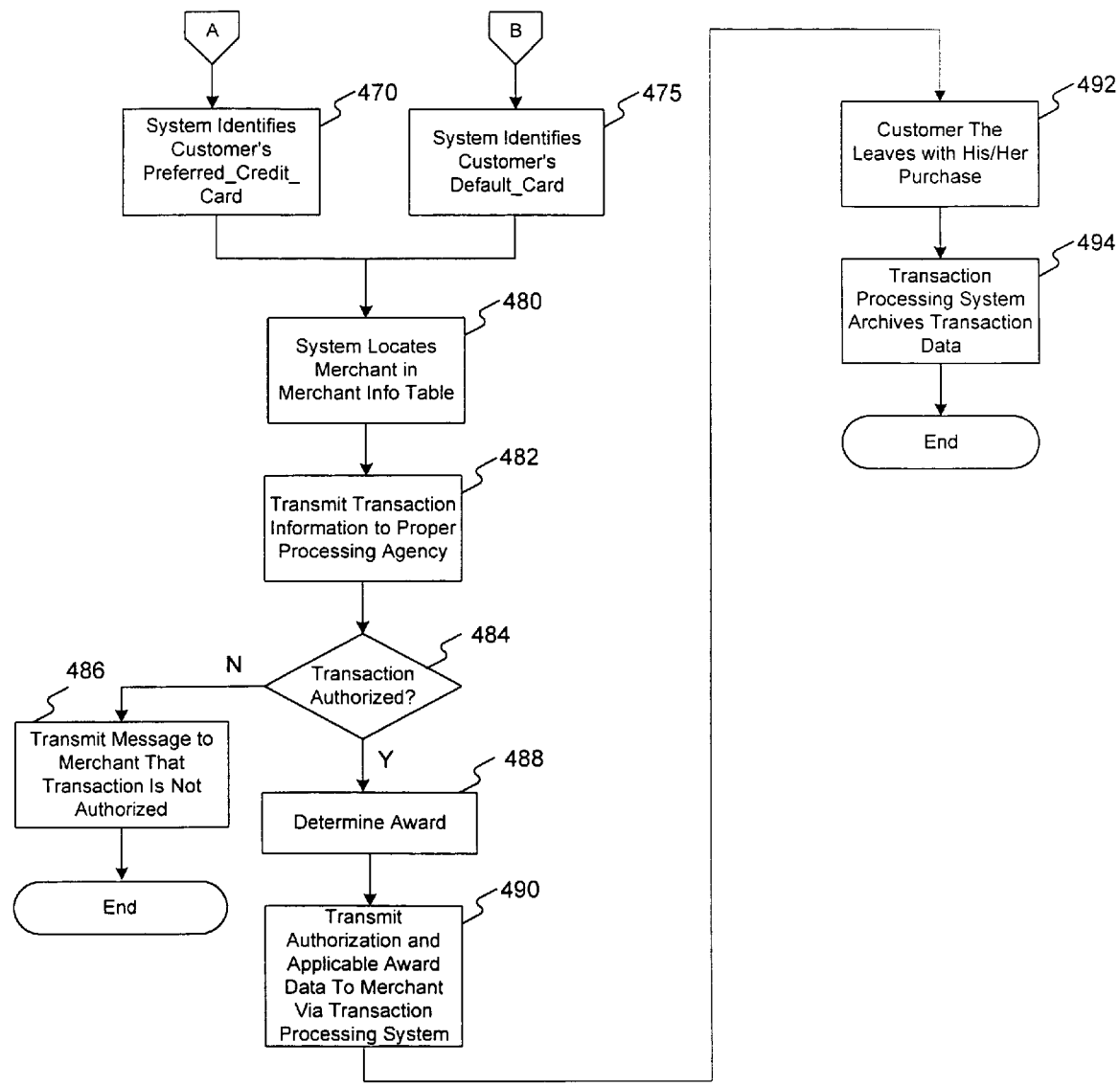
FIG. 15 is a detailed flow diagram depicting the steps performed to process a customer transaction in accordance with the present invention.

FIG. 15 is a detailed flow diagram depicting the steps performed in step 400 of FIG. 13. As shown in step 410, the first step occurs when a customer shopping in merchant store 12 identifies merchandise for purchase to a sales associate. Next in step 415, the sales associate utilizes input device 40 of POS device 34 to enter the merchandise into CPU 36 which then computes a transaction amount. After reviewing the transaction record, the customer in step 420 identifies him/herself to system 26 by interfacing customer transceiver 50 with merchant transceiver 48. Customer transceiver 50 consists of an electronic transmitter/receiver combination including a unique customer/transmitter ID number programmed therein. When customer transceiver 50 interfaces with merchant transceiver 48, a customer identification signal including the unique customer/transmitter ID number is transmitted to merchant transceiver 48. To provide security, merchant transceiver 48 and customer transceiver 50 employ technology in which an interrogation signal is transmitted from merchant transceiver 48 to customer transceiver 50. Customer transceiver 50 processes the interrogation signal with an algorithm which is fixedly programmed into customer transceiver 50 and then transmits a response back to merchant transceiver 48, consisting of a customer/transmitter ID number. The interrogation signal and the response signal are highly encrypted such that intense processing power over a long period of time will be necessary to fraudulently extract the unique customer/transmitter ID number from the customer transceiver 50.

Once merchant transceiver 48 receives the customer/transmitter ID number, it transmits the data, together with the specifics of the retail transaction (cost, identification of merchandise, etc.) over communications link 28 to transaction processing system 26 (step 425). An important feature of system 10 is that the customer's credit card is never exchanged with a sales associate. Therefore, the possibility that the card will be fraudulently used by an unscrupulous sales associate does not arise.

An alternate embodiment of the present invention includes a system 26 that instead of transmitting a customer's credit card number across communication links (FIGS. 3 and 9), only transmits a customer/transmitter ID across communication links. In this embodiment, payment processor 16 maintains data that provides a correlation between customer/transmitter ID numbers and payment methods. Also, merchant store 12 creates a transaction record based using the customer/transmitter ID number instead of the credit/debit card number. In operation, when an authorization request is transmitted to transaction processing system 26 from a merchant store 12, transaction processing system 26 processes transactions by matching the customer/transmitter ID number with data stored in customer information database 100. After the system identifies the customer ID (step 435), it links it to the customer's name (step 445) and then to the transaction information (step 450). If the system does not find the customer ID in step 435, it transmits a message to the merchant informing it that the customer is attempting to utilize an invalid customer transceiver (step 440). If the system finds the customer ID in step 435, it may simultaneously authorize the retail transaction, pending final authorization by the payment processor 16. That is, at the same time as the rest of the authentication process is occurring, the system may authorize the initiation of delivery of the desired goods services. For example, during an automobile refueling process, the system will activate a fuel pump, minimizing the customer's delay even though final approval has not yet been obtained. If in step 460, the system finds the merchant's name, it identifies the customer's payment method for that particular merchant (step 470) and determines the flow and destination of the authorization data, based on the type of transaction (credit, debit, cash, etc.) Security information may also be utilized by the transaction processing system 26 to reduce misuse of customer transceiver 50. Examples of controls include but are not limited to checking the frequency of use of a particular customer transceiver 50 within a certain period of time, frequency of use a customer transceiver 50 within certain financial limits and frequency of use of customer transceiver 50 and financial limits within a specific geographic region.

In the event that the transaction requires authorization, such as in a credit card transaction, the merchant POS device 34 communicates with transaction processing system 26 as described above to identify the correct payment processor 16 and transmit the transaction request to that payment processor for disposition. If the transaction is authorized in step 484, the system next in step 488 determines whether the customer is entitled to any frequent customer, or loyalty awards by comparing the customer's transaction activity stored in transaction information 110 with the loyalty program information 108. The authorization and the award data (if any) are transmitted to the merchant via the transaction processing system 26 (step 490) and in step 492, the customer is given his merchandise or services and notified of his/her award. In step 494 the transaction processing system 26 archives the transaction data in secondary storage device 94 for later analysis. If for some reason the payment processing system 16 is not able to process this particular transaction due to, for example, communication's difficulties or a transaction amount causing the customer to exceed his credit limit, a message is transmitted to the merchant via the transaction processing system 26 in step 486 that the transaction is not authorized and the in-progress delivery of merchandise (e.g., gasoline) is immediately discontinued. The sales associate is then notified in a well-known manner to ask the customer for an alternative method of payment and processing terminates. While this specification provides that the transaction terminates when the payment method cannot be authorized, there are several other alternatives that can be implemented without departing from the scope of the present invention. For example, if the payment method does not work, it is possible that an alternate could be requested by the system and utilized.

If the transaction does not require authorization (i.e., cash or other liquid asset is used), POS device 34 still communicates with transaction processing system 26 to provide transaction information 110 and loyalty program information 108 to customer information database 100 and to determine whether the customer is entitled to a loyalty award.

A customer may also utilize transaction processing system 26 to conduct inquiries into the customer's progress toward fulfilling the requirements of a particular loyalty program. To initiate the request, the customer accesses the transaction processing system 26 as mentioned above (i.e., by telephoning a human customer assistance representative and verbally communicating the request over the telephone, or dialing a telephone number and interfacing with a computer using DTMF tones, or logging onto the Internet and accessing a predetermined URL), and then communicating his/her request.

Figure 16:
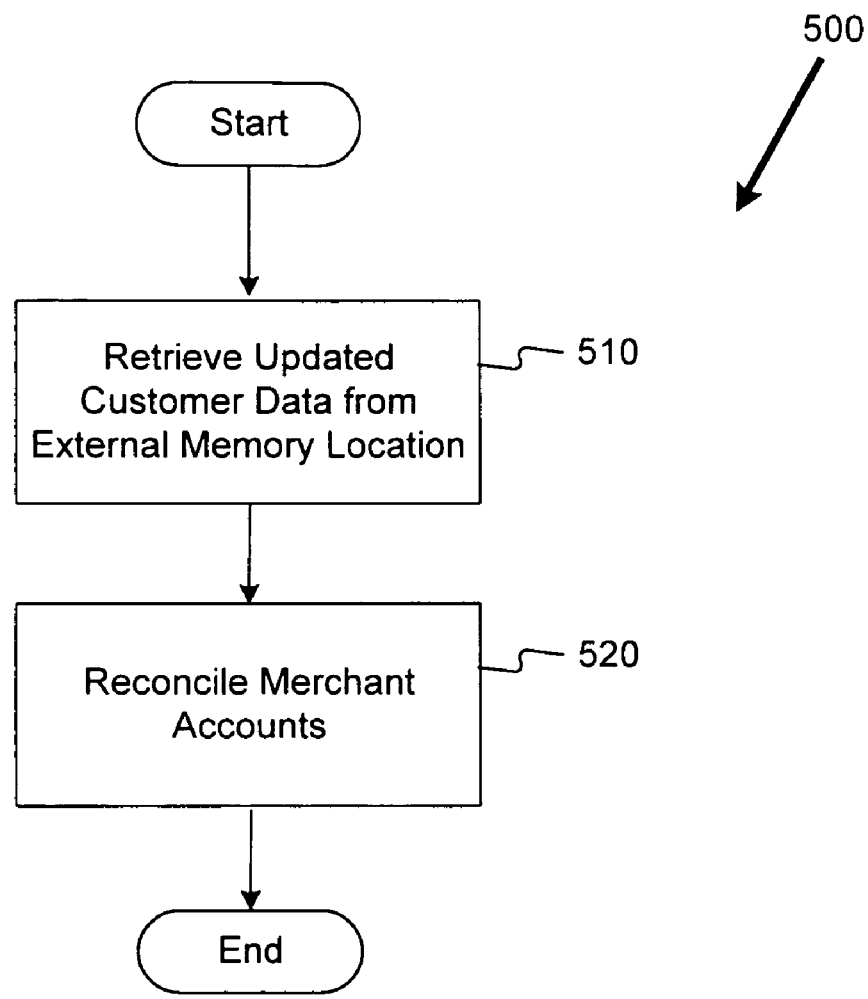
FIG. 16 is a detailed flow diagram depicting the steps performed to perform an end of day closing in accordance with the present invention.

FIG. 16 is a detailed flow diagram depicting the steps performed in step 500 of FIG. 13. In a preferred embodiment, customers can update information contained in the customer information database 100 by following the same process utilized when the information is first communicated to the system. The reason for the update can range anywhere from changed circumstances (customer address, status change, etc.) to changing preferences with respect to specific merchants to adding new merchants for a customer. Data security controls are utilized to ensure that only legitimate customers can access and modify their profile data. To preclude customer updates from interfering with the operation of the system, it is envisioned that transaction processing system 26 will update customer information database 100 at predetermined times during the day, preferably during off-peak usage times. As shown in step 510, transaction processing system 26 periodically retrieves updated customer profile data from an online memory location (RAM 88, or secondary storage device 94). In step 520, the transaction processing system 26 reconciles merchant accounts. That is, the system aggregates merchant sales, credits merchants and payment processors when appropriate and then presents invoices to each merchant and payment processor, based on sales activities. Customer profile information 102, merchant information 104, transaction information 110, and customer payment method information 112 are used to determine the fees to be paid to each entity (merchant store 12 and payment processor 16, and transaction processing system 26, as appropriate.) Once the information is aggregated, the transaction processing system 26 updates customer profile data (step 530).

The process depicted in FIG. 16 does not include the process performed when a user seeks to have his/her transponder inactivated due to it being lost or stolen. In this case, the database will be immediately updated in order to preclude fraudulent use of the transponder by unauthorized personnel.

Figure 17:
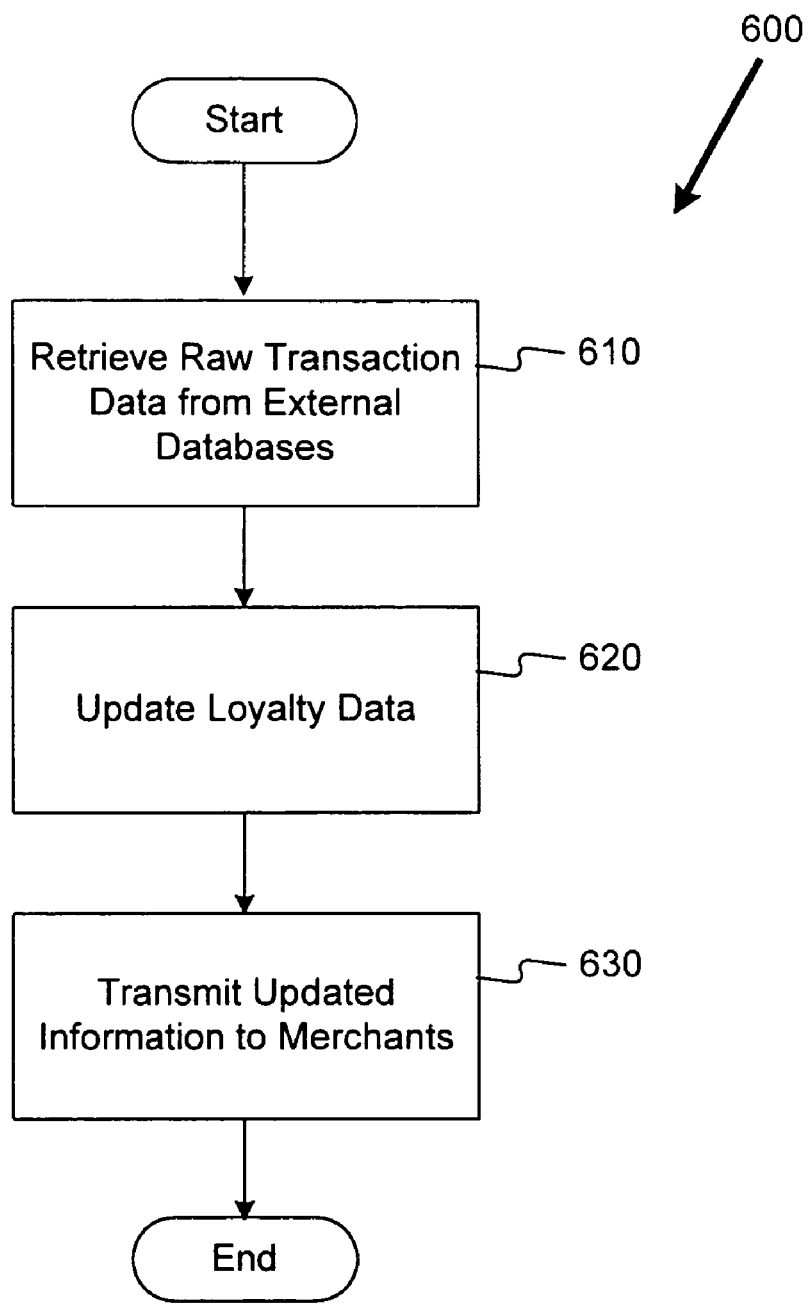
FIG. 17 is a detailed flow diagram depicting the steps performed to manage a customer loyalty program in accordance with the present invention.

FIG. 17 is a detailed flow diagram depicting the steps performed in step 600 of FIG. 13. The transaction processing system 26, as shown in step 610 periodically retrieves raw transaction data from secondary storage device 94. This retrieval can be performed at a predetermined time each day, or it can be performed shortly after the transaction is completed. In any event, the raw transaction data consists of customer profile information 102, merchant information 104, loyalty program information 108, transaction information 110, and customer personal information 114. This data is collected and analyzed for different purposes such as determining the effectiveness of the transaction processing system 26, refining and developing new, related products, and developing, tracking and analyzing loyalty programs and special promotions that are of specific interest to transaction processing system 26 customers and merchants. In addition, the information may be sold to merchant companies 12 and payment processing systems 16 to provide personalized service to individual customers. It is expected that merchant companies would pay for data from transaction processing system 26 based on volume or a per project basis. In step 620, the transaction processing system 26 updates loyalty data and in step 630, the updated information is transmitted to merchants who desire the additional data customer transaction data with demographic data that may be used to track customer purchasing trends.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
a merchant transceiver, comprised of a transceiver antenna, that (a) sends a first radio frequency communication to a customer transceiver and (b) receives a second radio frequency communication conveying a customer/transmitter identifier from said customer transceiver;
a point-of-sale device processor, in communication with said merchant transceiver, that (a) captures transaction data and (b) transmits an authorization request to a transaction processing system; and
a transaction processing system comprising a memory having program instructions, and a processor configured to use said program instructions to (a) receive said authorization request, (b) determine, from said customer/transmitter identifier and a merchant identifier, a payment method corresponding to a payment processor, (c) transmit an authorization request to said payment processor for authorization and (d) transmit to said point-of-sale device said payment processor's response to said authorization request,
wherein a merchant is associated with a given brand,
wherein the merchant identifier is the same for all stores associated with the given brand,
wherein each customer/transmitter identifier is associated with a customer account and wherein each customer account identifies a pre-assigned payment method for each merchant identified in the customer account and, in multiple customer accounts, the pre-assigned payment methods vary for transactions with merchants associated with different brands.

2. The system of claim 1, further comprising:
a customer transceiver comprising memory and a processor coupled to said memory,
wherein said customer transceiver receives the first radio frequency communication and subsequently transmits the second radio frequency communication that conveys the customer/transmitter identifier, and
wherein said processor is adapted to read data from, and write data to, said memory.

3. The system of claim 2, wherein said customer transceiver is further comprised of a security device operable to capture biometric data and to convert said data into an electronic representation of said data.

4. The system of claim 3, wherein said biometric data is a fingerprint.

5. The system of claim 3, wherein said biometric data is a palm print.

6. The system of claim 3, wherein said customer transceiver processor is adapted to: compare an electronic representation of said captured biometric data with a digital image stored in said customer transceiver memory; and transmit said customer/transmitter identifier when said captured biometric data is identical to said digital image stored in said customer transceiver memory.

7. The system of claim 2, wherein said customer transceiver processor is adapted to: compare a transaction amount with a dollar amount stored in said customer transceiver memory; and inhibit transmission of said customer/transmitter identifier when said transaction amount is greater than said dollar amount.

8. The system of claim 2, wherein said customer transceiver processor is adapted to subtract a transaction amount from a dollar amount stored in said customer transceiver memory when said transaction is authorized.

9. The system of claim 1, further comprising:
a customer transceiver comprising memory, a processor coupled to the memory, and a keyboard coupled to the processor,
wherein said customer transceiver receives the first radio frequency communication and subsequently transmits the second radio frequency communication that conveys the customer/transmitter identifier, and
wherein said processor is operable to transmit information stored in said memory, or manually entered via said keyboard.

10. The system of claim 1, further comprising:
a customer transceiver embedded inside an article of clothing, wherein the customer transceiver receives the first radio frequency communication and subsequently transmits the second radio frequency communication that conveys the customer/transmitter identifier.

11. The system of claim 1, further comprising:
a customer transceiver embedded inside an item of jewelry, wherein the customer transceiver receives the first radio frequency communication and subsequently transmits the second radio frequency communication that conveys the customer/transmitter identifier.

12. The system of claim 1, further comprising:
a customer transceiver embedded inside an electronic device, wherein the customer transceiver receives the first radio frequency communication and subsequently transmits the second radio frequency communication that conveys the customer/transmitter identifier.

13. The system of claim 1 wherein said merchant transceiver is further comprised of: a processor coupled to the transceiver; and a keyboard coupled to the processor; wherein said processor is operable to receive information manually entered into said keyboard or received via said transceiver.

14. The system of claim 13, wherein said merchant transceiver is further comprised of a display device for displaying information to a user.

15. The system of claim 13, wherein said merchant transceiver is further comprised of a printer for printing a receipt.

16. The system of claim 13, wherein said merchant transceiver is further comprised of a memory operable to store information relating to a transaction.

17. The system of claim 13, wherein said merchant transceiver is further comprised of a communication interface for communicating with at least the point-of-sale device.

18. The system of claim 17, wherein said communication interface provides wireless connectivity to the point-of-sale device.

19. The system of claim 1 wherein said customer/transmitter identifier does not contain a customer's credit card or debit card number.

20. The system of claim 1, further comprising:
a customer transceiver comprising memory, wherein said customer transceiver generates operating power after receiving the first radio frequency communication and subsequently transmits the second radio frequency communication that conveys the customer/transmitter identifier.

21. The system of claim 1, wherein the point-of-sale device combines the transaction data with the customer/transmitter identifier and the merchant identifier to form the authorization request.

22. A computer-implemented method comprising:
transmitting a first radio frequency communication to a customer transceiver;
receiving a second radio frequency communication including customer identification data at a receiver;
creating an authorization request based in part upon the receipt of the customer identification data, the authorization request comprising transaction data and the received customer identification data;
communicating the authorization request to a transaction processor;
selecting a payment method corresponding to a payment processor, at the transaction processor, based at least in part upon information associated with the customer identification data and a merchant identifier stored in a database accessible by the transaction processor; and
communicating with the selected payment processor for approval and payment,
wherein a merchant is associated with a given brand,
wherein the merchant identifier is the same for all stores associated with the given brand,
wherein the customer identification data is associated with a customer account, and
wherein each customer account identifies a preassigned payment method for each merchant identified in the customer account and, in multiple customer accounts, the preassigned payment methods vary for transactions with merchants associated with different brands.

23. The method of claim 22, the creating an authorization request further comprising:
communicating said customer identification data to a point-of-sale device and having the point-of-sale device create the authorization request.

24. The method of claim 23, said receiver is coupled to said point-of-sale.

25. The method of claim 23, said point-of-sale device is integral with said receiver.

26. The method of claim 23 wherein the point of sale device is coupled to a security device that prevents unauthorized use of the transceiver.

27. The method of claim 26 wherein the security device further comprises a biometric recording device.

28. The method of claim 23 further comprising:
inputting a password or Personal Identification Number (PIN) into a security device in communication with said point of sale device.

29. The system of claim 22 wherein said customer identification data does not contain a customer's credit card or debit card number.

30. The method of claim 22, further comprising:
processing the purchase transaction for approval and payment.

31. The method of claim 22, wherein the communicating the authorization request to a transaction processor further comprises encrypting the authorization request.

32. The method of claim 22, further comprising:
processing the authorization request at the transaction processor according to one of the one or more preassigned payment methods.

33. The payment method of claim 22, wherein the preassigned payment method(s) are preselected by a customer.

34. The method of claim 22, further comprising:
upon receiving the first radio frequency communication subsequently transmitting, from the customer transceiver, the second radio frequency communication that conveys the customer identification data.

35. The method of claim 34, wherein the customer transceiver generates operating power after receiving the first radio communication.

36. The method of claim 22, wherein the authorization request further comprises the merchant identifier.

37. The method of claim 22, further comprising the step of determining, from said transaction data, a loyalty award and storing information pertaining to said loyalty award with the customer account information.

38. The method of claim 37 where the loyalty award is redeemable with a merchant other than the merchant associated with the merchant identifier.

39. The method of claim 38 where the loyalty award is credited in the customer account using a another merchant identifier.

40. The method according to claim 22, further comprising:
determining, from said customer identification data, loyalty award program data that corresponds to said customer identification data, said merchant identifier, or a combination thereof,
wherein the loyalty award program data comprises a loyalty award amount that is redeemable with a merchant other than the merchant associated with the merchant identifier.

41. A method for processing transactions comprising the steps of:
receiving a communication at a point-of-sale device, said communication comprising customer identification data;
transmitting an authorization request from said point-of-sale device to a transaction processing system, said authorization request comprising a merchant identifier, transaction data, and said customer identification data; and
receiving a response to said authorization request from said transaction processing system,
wherein a merchant is associated with a given brand,
wherein the merchant identifier is the same for all stores associated with the given brand,
wherein the customer identification data is associated with a customer account, and
wherein each customer account identifies a pre-assigned payment method for each merchant identified in the customer account and, in multiple customer accounts the preassigned payment methods vary for transactions with merchants associated with different brands.

42. A method for collecting consumer purchasing trend information in a transaction processing system, said method comprising the computer-implemented steps of:
receiving a communication at one of a plurality of point-of-sale devices, said communication comprising customer identification data;
transmitting an authorization request from one of said plurality of point-of-sale devices to said transaction processing system, said authorization request comprising a merchant identifier, transaction data, and said customer identification data; and
updating a database with said transaction data and said customer identification data,
wherein a merchant is associated with a given brand,
wherein the merchant identifier is the same for all stores associated with the given brand,
wherein the customer identification data is associated with a customer account, and
wherein each customer account identifies a pre-assigned payment method for each merchant identified in the customer account and, in multiple customer accounts the pre-assigned payment methods vary for transactions with merchants associated with different brands.

43. A method of monitoring customer progress in a merchant award program, comprising the steps of:
receiving a communication at one of a plurality of point-of-sale devices, said communication comprising customer identification data;
transmitting an authorization request from one of said plurality of point-of-sale devices to a transaction processing system, said authorization request comprising a merchant identifier, said transaction data, and said customer identification data; and
crediting a customer account in a database with loyalty points indicative of said transaction data,
wherein a merchant is associated with a given brand,
wherein the merchant identifier is the same for all stores associated with the given brand,
wherein the customer identification data is associated with a customer account, and
wherein each customer account identifies a pre-assigned payment method for each merchant identified in the customer account and, in multiple customer accounts, the pre-assigned payment methods vary for transactions with merchants associated with different brands.

44. The method according to claim 43, wherein the loyalty points are redeemable with a merchant other than a merchant associated with the merchant identifier.

* * * * *